(12) United States Patent
Nagae et al.

(10) Patent No.: US 7,050,638 B2
(45) Date of Patent: May 23, 2006

(54) BINARY-CODING PATTERN CREATING METHOD AND APPARATUS, BINARY-CODING PATTERN, AND COMPUTER-READABLE RECORDING MEDIUM IN WHICH BINARY-CODING PATTERN CREATING PROGRAM IS RECORDED

(75) Inventors: Akiko Nagae, Yokohama (JP); Nobuaki Usui, Kawasaki (JP); Tetsuo Asano, Kanazawa (JP)

(73) Assignee: Fujitsu Limited, Kawasaki (JP)

( * ) Notice: Subject to any disclaimer, the term of this patent is extended or adjusted under 35 U.S.C. 154(b) by 644 days.

(21) Appl. No.: 10/000,072

(22) Filed: Dec. 4, 2001

(65) Prior Publication Data

US 2002/0101617 A1    Aug. 1, 2002

(30) Foreign Application Priority Data

Dec. 8, 2000  (JP) .............................. 2000-374958
Sep. 14, 2001  (JP) .............................. 2001-279535

(51) Int. Cl.
G06K 9/36 (2006.01)
G06K 9/18 (2006.01)
H04N 1/40 (2006.01)

(52) U.S. Cl. ...................... 382/237; 382/181; 358/3.02
(58) Field of Classification Search ................ 382/108, 382/181, 237; 358/3.01, 3.02, 3.03, 3.04, 358/3.05, 3.06, 534
See application file for complete search history.

(56) References Cited

U.S. PATENT DOCUMENTS

| | | | | |
|---|---|---|---|---|
| 5,757,976 A | * | 5/1998 | Shu | 382/237 |
| 5,859,955 A | * | 1/1999 | Wang | 382/237 |
| 6,532,082 B1 | * | 3/2003 | Dewitte | 358/3.3 |
| 6,687,021 B1 | * | 2/2004 | Kerz | 358/1.9 |

FOREIGN PATENT DOCUMENTS

| | | |
|---|---|---|
| JP | 7-146945 | 6/1995 |
| JP | 10-75361 | 3/1998 |
| JP | 10-126618 | 5/1998 |

* cited by examiner

*Primary Examiner*—Duy M. Dang
(74) *Attorney, Agent, or Firm*—Staas & Halsey LLP

(57) ABSTRACT

A method is provided for creating a binary-coding pattern to be used in binary-coding a multi-value image. The method includes the steps of: creating a basic pattern shape of the prospective binary-coding pattern by a first arithmetic operation; determining the sequence of lighting pixels composing such basic pattern by a second arithmetic operation; and creating a rectangular pattern, which serves as the prospective binary-coding pattern, based on the resultant basic pattern. Hereby, it is possible to automatically create a centralized type of binary-coding pattern, and also it is possible to facilitate creating a minimum-sized binary-coding pattern.

52 Claims, 17 Drawing Sheets

1 : BINARY-CODING PATTERN CREATING APPARATUS

1: BINARY-CODING PATTERN CREATING APPARATUS

↓ CONVERTED INTO DOTS

FIG. 7

```
0-th solution (a, b, c, d) = (6, 6, 6, 6)  slope= 0.000000
1-th solution (a, b, c, d) = (6, 6, 7, 5)  slope= 0.000000
2-th solution (a, b, c, d) = (6, 6, 5, 7)  slope= 0.000000
3-th solution (a, b, c, d) = (7, 5, 6, 6)  slope= 0.000000
4-th solution (a, b, c, d) = (6, 5, 6, 7)  slope= 0.142857
5-th solution (a, b, c, d) = (7, 6, 5, 6)  slope= 0.142857
6-th solution (a, b, c, d) = (6, 6, 8, 4)  slope= 0.000000
7-th solution (a, b, c, d) = (6, 6, 4, 8)  slope= 0.000000
8-th solution (a, b, c, d) = (8, 4, 6, 6)  slope= 0.000000
9-th solution (a, b, c, d) = (7, 4, 4, 8)  slope= 0.428571
```

□ : RECTANGULAR PATTERN

NEXT REFERENCE DOT

PROCESSING FOR DOT POSITIONED ON BOUNDARY LINE
  LOWER AND LEFT SIDES → INCLUDED IN PATTERN
  UPPER AND RIGHT SIDES → NOT INCLUDED
  ONLY LOWEST ONE OF THE FOUR CORNER DOTS INCLUDED

REFERENCE DOT

↓ ARRANGE BASIC PATTERNS ALL OVER THE PLANE

IN THIS EXAMPLE,
a=5,b=2,c=2,d=4
n=ad+bc=20+4=24

: BASIC PATTERN
: RECTANGULAR PATTERN
: PARTIAL RECTANGULAR AREA ↓ DITHER PATTERN

BINARY-CODING PATTERN CREATING METHOD AND APPARATUS, BINARY-CODING PATTERN, AND COMPUTER-READABLE RECORDING MEDIUM IN WHICH BINARY-CODING PATTERN CREATING PROGRAM IS RECORDED

BACKGROUND OF THE INVENTION

1. Field of the Invention

The present invention relates to a binary-coding pattern (dither pattern table) for use in converting continuous tone images (natural images, graphic images, colored characters, and others) into binary images—hereinafter this process will be also called "binary-coding". The invention also relates to a method and an apparatus for creating such a binary-coding pattern and to a computer-readable recording medium in which a binary-coding pattern creating program is recorded.

2. Description of the Related Art

When continuous tone images (natural images, graphic images, and colored characters), which is input from input devices such as scanners, are output from output devices such as printers, the images must be converted into binary images, so that their continuous tone is expressed by ON/OFF of coloring materials (ink, toner, or the like; hereinafter also called "dot").

Dithering is a well-known method of such conversion (binary-coding). In dithering, the value of one specific pixel (object pixel) of a continuous tone image is compared with a predetermined threshold to decide the intensity level of the pixel. In accordance with this intensity level, the ON/OFF of the dot corresponding to the object pixel is determined using a binary-coding pattern prepared previously.

So far, binary-coding patterns have been created based on skilled persons' intuitions and experiences. For example, when creating a binary-coding pattern, a group of pixels (hereinafter called "basic pattern") composing a single halftone dot is generated. Errors are rounded at regular intervals for minimizing them, or multiple basic patterns are arranged, so as to make a huge pattern that is called a "super cell", so that halftone dot displacement is minimized.

For supporting operators in creating binary-coding pattern, there are known various techniques such as those disclosed in Japanese Unexamined Patent Application Publications HEI 10-126618, HEI 7-146945, and HEI 10-75361.

HEI 10-126618 discloses a halftone pattern creating method. At any screen angle except but 0°, errors caused by inclined small basic cells are compensated by changing the number of dots.

Further, in HEI 7-146945, the length of the sides of a super cell to be generated and the screen frequency of the super cell are calculated by floating-point arithmetic operations to create the super cell. This would make it possible to create dither patterns having arbitrary screen angles.

Still further, HEI 10-75361 discloses a technique for realizing a halftone dot having a screen angle that is close to the designated one, by using super cells. Additionally, it also discloses another technique in which two or more basic patterns are made to behave as a single unit. It is thereby possible to reduce the difference, between halftone dots, in the number of pixels contained in the basic patterns that make up one halftone dot.

The above-described conventional binary-coding pattern creating methods, all of which depends on skilled operator's intuition and their experiences, have been accompanied with the following problems. It is impossible to predict the conversion results that a prospective binary-coding pattern now being created would probably cause. Accordingly, operators are enforced to repeat such operation procedures as binary-coding pattern creation, printout, and confirmation. After much trial and error, it will be finally possible to select the most appropriate binary-coding pattern, thus necessitating a significantly long time in creating a binary-coding pattern.

Further, the binary-coding pattern thus selected is not always the best one, and also, errors and misidentifications occur significantly frequently because of manual operations performed by the operators. Moreover, a try-and-error method would require increased resources (paper and ink, or else) because of repeated operations, thus being not economical.

Furthermore, in HEI 10-126618, the number of pixels assigned to each half tone dot is not always the same, because the number of cells varies in this method, so that unevenness might show up in output images, and moire might also appear on the boundaries of adjoining super cells.

In HEI 7-146945, since floating-point arithmetic operations are performed for obtaining the length of the sides of a super cell to be generated and the screen frequency of the super cell, a quantizing error finally obtained might be caused to be enormous.

Further, in HEI 10-75361, since two or more basic patterns are used to make up one single super cell for reducing errors, it is necessary to create a huge super cell, and the amount of memory needed for reading-in a halftone pattern would be significantly increased, thus causing increased hardware manufacturing costs.

An error-diffusing dithering method is suitable for use in outputting an image at relatively low resolution. In general, in case where the amount of coloring material (say, ink) to be fixed for each pixel on a print medium is very small, difficulties are encountered in fixing isolated spots of the material. Accordingly, with recent printers realizing outputs of high resolution, the error-diffusing dithering has a problem of difficulty in fixing a tiny amount of coloring material for each pixel onto the print medium.

Further, a centralized dithering method is well-known as a dithering technique. In the method, in accordance with the gray intensity levels of pixels, coloring material is placed (lighted) onto the pixels sequentially from the one nearer to a predetermined center point.

The centralized dithering technique is advantageous in that dot gains are minimized and the coloring material can be fixed stably on a printing medium, and thus this technique is more preferable than the error-diffusing one in case where the amount of color material to be put on each pixel is significantly small. For these reasons, it has been longed that a simple method of creating a binary-coding pattern for use in such centralized dithering is accomplished.

SUMMARY OF THE INVENTION

With the foregoing problems in view, one object of the present invention is to provide a binary-coding pattern creating method, with which a binary-coding pattern composed of a desired number of pixels with a desired pattern angle is created with ease, and a centralized type of binary-coding pattern, in particular, and a minimum-sized binary-coding pattern are also easily created.

Another object of the invention is to provide an apparatus for carrying out the above-mentioned method.

A further object of the invention is to provide a computer-readable recording medium storing a binary-coding pattern creating program.

In order to accomplish the above objects, according to the present invention, there is provided a method of creating a binary-coding pattern to be used in binary-coding a multi-value image. The method comprises the steps of: (a) creating a basic pattern shape of the prospective binary-coding pattern by a first arithmetic operation; (b) determining the sequence of lighting pixels composing such basic pattern; and (c) creating a rectangular pattern, which serves as the prospective binary-coding pattern, based on the resultant basic pattern.

As one generic feature of the present invention, a method is provided of creating a binary-coding pattern to be used in binary-coding a multi-value image, which method comprises the steps of: (a) creating a basic pattern shape of the prospective binary-coding pattern; (b) determining the sequence of lighting pixels composing such basic pattern by a first arithmetic operation; and (c) creating a rectangular pattern, which serves as the prospective binary-coding pattern, based on the resultant basic pattern.

As another generic feature of the present invention, there is provided a method of creating a binary-coding pattern to be used in binary-coding a multi-value image, which method comprises the steps of: (a) creating a basic pattern shape of the prospective binary-coding pattern by a first arithmetic operation; (b) determining the sequence of lighting pixels composing such basic pattern by a second arithmetic operation; and (c) creating a rectangular pattern, which serves as the prospective binary-coding pattern, based on the resultant basic pattern.

As one preferred feature, instep (c), the rectangular pattern may be created by a third arithmetic operation.

As another preferred feature, step (a) includes the steps of: (a-1) designating a pattern angle through which the binary-coding pattern is turned; (a-2) designating the number of pixels composing the basic pattern; and (a-3) executing an arithmetic operation based on the pattern angle designated in step (a-1) and the number of pixels designated in step (a-2).

As still another preferred feature, in step (a), one or more rectangles are created which have the following corner points: point A(c, 1); point B(a+c, b+1); point C(0, d+1); and point D(a, b+d+1), parameters a, b, c, and d being arbitrary integers satisfying an equation of n=ad+bc, where n is the number of pixels, which is designated in step (a-2), and the one, out of such rectangles, which is at an angle approximate to the pattern angle designated in step (a-1), is selected as the basic pattern.

As a further preferred feature, in step (b), the sequence of lighting the pixels is determined based on a distance between a predetermined point in the basic pattern and each of the last-named pixels.

As a still further preferred feature, in step (b), the sequence of lighting the pixels is determined in such a manner that the pixels are lighted sequentially from the one nearer to a predetermined point of the basic pattern, and that the length of an outline of the lighted pixels adjoining to the non-lighted ones is minimal.

As an additional preferred feature, in step (b), the sequence of lighting the pixels is determined based on a coefficient which relates to a distance between a predetermined point in the basic pattern and each of the last-named pixels.

Furthermore, as another preferred feature, in step (b), the sequence of lighting the pixels is determined based on a weight which has been assigned to each of the pixels by an arithmetic operation according to a distance between a predetermined point in the basic pattern and each of the last-named pixels.

As still another preferred feature, in step (c), the rectangular pattern is created by cutting a rectangle in a particular size from a spread of the basic patterns in which the basic patterns are arranged successively in both a primary image scanning direction and a secondary image scanning direction.

As a further preferred feature, in step (c), a motif-pattern showing a distinctive characteristic of the rectangular pattern is cut from the rectangular pattern to represent the rectangular pattern.

Furthermore, as one preferred feature, the motif-pattern occupies a rectangular area that is measured Y in the primary scanning direction by i in the secondary scanning direction, thus being composed of Y×i pixels; Y measured in the primary scanning direction is equal to a length, measured in the primary scanning direction, of the rectangular pattern of the particular size; and i measured in the secondary scanning direction is equal to a minimum quantity (the number of pixels), measured in the secondary scanning direction, essential for the rectangular area to include a complete set of lightening sequence numbers determined one for each of the pixels composing the basic pattern in step (b).

As another preferred feature, in step (c), the rectangular pattern is created by an arithmetic operation such that size (X) of the rectangular pattern measured in a secondary scanning direction satisfies:

$$size(X)=\max((n \div gcd(b,n)),(n \div gcd(d,n)))$$

and size (Y) of the rectangular pattern measured in a primary scanning direction satisfies:

$$size(Y)=\max((n \div gcd(a,n)),(n \div gcd(c,n)))$$

As an additional generic feature, there is provided a binary-coding pattern which is created based on a basic pattern and is to be used in binary-coding a multi-value image, wherein a series of halftone dots arranged in a network fashion is generated by lighting pixels of the basic pattern sequentially from the one nearer to a predetermined point of the prospective basic pattern in such a manner that the length of an outline of the lighted pixels adjoining to the non-lighted ones is minimal.

As one preferred feature, the sequence of lighting the pixels is determined based on a coefficient which relates to a distance between a predetermined point in the basic pattern and each of the pixels.

As a still additional generic feature, there is provided a rectangular binary-coding pattern which is created based on a basic pattern and is to be used in binary-coding a multi-value image, wherein a series of halftone dots arranged in a network fashion is generated by lighting pixels of a motif-pattern, which shows a distinctive characteristic of the binary-coding pattern, in a predetermined sequence, and by arranging the motif-pattern in repetitions in accordance with a predetermined rule.

As one preferred feature, the motif-pattern occupies a rectangular area that is measured Yin the primary scanning direction by i in the secondary scanning direction, thus being composed of Y×i pixels; Y measured in the primary scanning direction is equal to a length, measured in the primary scanning direction, of the rectangular pattern of the particular size; and i measured in the secondary scanning direction is equal to a minimum quantity (the number of pixels), measured in the secondary scanning direction, essential for the rectangular area to include a complete set of lightening sequence numbers determined one for each of the pixels composing the basic pattern.

As a further generic feature, there is provided an apparatus for creating a binary-coding pattern to be used in binary-coding a multi-value image. The apparatus comprises: a basic pattern shape creating section for creating a basic pattern shape of the prospective binary-coding pattern by a first arithmetic operation; a lighting sequence determining section for determining the sequence of lighting pixels composing such basic pattern by a second arithmetic operation; and a rectangular pattern creating section for creating a rectangular pattern, which serves as the prospective binary-coding pattern, by a third arithmetic operation based on the resultant basic pattern.

As one preferred feature, the basic pattern shape creating section includes: an angle designating section for designating a pattern angle through which the prospective binary-coding pattern is turned; a number-of-pixels designating section for designating the number of pixels composing the basic pattern; and an arithmetic section for executing an arithmetic operation based on the pattern angle designated by the angle designating section and the number of pixels designated by the number-of-pixels designating section.

As another preferred feature, the basic pattern shape creating section creates one or more rectangles which have the following corner points: point A(c, 1); point B(a+c, b+1); point C(0, d+1); and point D(a, b+d+1), parameters a, b, c, and d being arbitrary integers satisfying an equation of n=ad+bc, where n is the number of pixels which is designated by the number-of-pixels designating section, and out of such rectangles, the basic pattern shape creating section selects the one which is at an angle approximate to the pattern angle designated by the number-of-pixels designating section, as the basic pattern.

As a still another preferred feature, the lighting sequence determining section determines the sequence of lighting the pixels based on a distance between a predetermined point in the basic pattern and each of the last-named pixels.

As a further preferred feature, the lighting sequence determining section determines the sequence of lighting the pixels in such a manner that the pixels are lighted successively from the one nearer to a predetermined point of the basic pattern, and that the length of an outline of the lighted pixels adjoining to the non-lighted ones is minimal.

As a still further preferred feature, the lighting sequence determining section determines the sequence of lighting the pixels based on a coefficient which relates to a distance between a predetermined point in the basic pattern and each of the last-named pixels.

As an addition preferred feature, the rectangular pattern creating section cuts such rectangular pattern in a particular size from a spread of the basic patterns in which the basic patterns are arranged successively in both a primary image scanning direction and a secondary image scanning direction.

Further, as another preferred feature, the rectangular pattern creating section cuts a motif-pattern, which shows a distinctive characteristic of the rectangular pattern, from the rectangular pattern as a representative of the rectangular pattern.

As a still another preferred feature, the motif-pattern occupies a rectangular area that is measured Y in a primary scanning direction by i in a secondary scanning direction, thus being composed of Y×i pixels; Y measured in the primary scanning direction is equal to a length, measured in the primary scanning direction, of the rectangular pattern of the particular size; and i measured in the secondary scanning direction is equal to a minimum quantity (the number of pixels), measured in the secondary scanning direction, essential for the rectangular area to include a complete set of lightening sequence numbers determined one for each of the pixels composing the basic pattern.

As a further preferred feature, the rectangular pattern creating section creates the rectangular pattern by an arithmetic operation such that size (X) of the rectangular pattern measured in a secondary scanning direction satisfies:

$$\text{size}(X)=\max((n\div gcd(b,n)),(n\div gcd(d,n)))$$

and size (Y) of the rectangular pattern measured in a primary scanning direction satisfies:

$$\text{size}(Y)=\max((n\div gcd(a,n)),(n\div gcd(c,n)))$$

As a further generic feature, there is provided a computer-readable recording medium which stores a binary-coding pattern creating program for creating a binary-coding pattern to be used in binary-coding a multi-value image, wherein the program instructs a computer to function as the following: (a) a basic pattern shape creating section for creating a basic pattern shape of the prospective binary-coding pattern by a first arithmetic operation; (b) a lighting sequence determining section for determining the sequence of lighting pixels composing such basic pattern by a second arithmetic operation; and (c) a rectangular pattern creating section for creating a rectangular pattern, which serves as the prospective binary-coding pattern, by a third arithmetic operation based on the resultant basic pattern.

As one preferred feature, the basic pattern shape creating section includes: an angle designating section for designating a pattern angle through which the prospective binary-coding pattern is turned; a number-of-pixels designating section for designating the number of pixels composing the basic pattern; and an arithmetic section for executing an arithmetic operation based on the pattern angle designated by the angle designating section and the number of pixels designated by the number-of-pixels designating section.

As another preferred feature, the basic pattern shape creating section creates one or more rectangles which have the following corner points: point A(c, 1); point B(a+c, b+1); point C(0, d+1); and point D(a, b+d+1), parameters a, b, c, and d being arbitrary integers satisfying an equation of n=ad+bc, where n is the number of pixels which is designated by the number-of-pixels designating section, and out of such rectangles, the basic pattern shape creating section selects the one which is at an angle approximate to the pattern angle designated by the number-of-pixels designating section, as the basic pattern.

As still another preferred feature, the lighting sequence determining section determines the sequence of lighting the pixels based on a distance between a predetermined point in the basic pattern and each of the last-named pixels.

As a further preferred feature, the lighting sequence determining section determines the sequence of lighting the pixels in such a manner that the pixels are lighted successively from the one nearer to a predetermined point of the basic pattern, and that the length of an outline of the lighted pixels adjoining to the non-lighted ones is minimal.

As a still further preferred feature, the lighting sequence determining section determines the sequence of lighting the pixels based on a coefficient which relates to a distance between a predetermined point in the basic pattern and each of the last-named pixels.

As an additional preferred feature, the rectangular pattern creating section cuts such rectangular pattern in a particular size from a spread of the basic patterns in which the basic patterns are arranged successively in both a primary image scanning direction and a secondary image scanning direction.

Furthermore, as another preferred feature, the rectangular pattern creating section cuts a motif-pattern, which shows a distinctive characteristic of the rectangular pattern, from the rectangular pattern as a representative of the rectangular pattern.

As still another preferred feature, the motif-pattern occupies a rectangular area that is measured Y in a primary scanning direction by i in a secondary scanning direction, thus being composed of Y×i pixels; Y measured in the primary scanning direction is equal to a length, measured in the primary scanning direction, of the rectangular pattern of the particular size; and i measured in the secondary scanning direction is equal to a minimum quantity (the number of pixels), measured in the secondary scanning direction, essential for the rectangular area to include a complete set of lightening sequence numbers determined one for each of the pixels composing the basic pattern.

As a further preferred feature, the rectangular pattern creating section creates the rectangular pattern by an arithmetic operation such that size (X) of the rectangular pattern measured in a secondary scanning direction satisfies:

$$\text{size}(X) = \max((n \div gcd(b,n)), (n \div gcd(d,n)))$$

and size (Y) of the rectangular pattern measured in a primary scanning direction satisfies:

$$\text{size}(Y) = \max((n \div gcd(a,n)), (n \div gcd(c,n)))$$

The binary-coding pattern creating method and apparatus, the binary-coding pattern, and the computer-readable apparatus recording medium in which binary-coding pattern creating program is recorded, according to the present invention guarantee the following advantageous results:

(1) Partly since a basic pattern shape of a prospective binary-coding pattern which is created by an arithmetic operation, partly since the sequence of lighting pixels composing such a basic pattern is determined, and partly since a rectangular pattern, which serves as the prospective binary-coding pattern, is created based on the resultant basic pattern, it is possible to facilitate creating the binary-coding pattern.

(2) Since a binary-coding pattern angle and the number of pixels composing a basic pattern are designated, and then creates a basic pattern shape by an arithmetic operation based on the thus designated angle and the number of pixels, it is possible to easily create a basic pattern which is at a desired angle and is composed of a desired number of pixels.

(3) Since the sequence of lighting pixels composing a basic pattern is determined based on a distance between the pixels and a predetermined point (center or barycenter) of the basic pattern, it is possible to facilitate creating a centralized type of binary-coding pattern.

(4) Since the sequence of lighting the pixels composing a basic pattern is determined based on (i) a distance between a predetermined point in the basic pattern and each of the pixels and (ii) a particular factor (rate of flattening) relevant to the distance, it is possible to change the shape of a halftone dot smoothly from a circular one to an oval one, and thus it is also possible to create a binary-coding pattern which would minimize dot displacement or moire, with fewer operation steps and increased reliability.

(5) Since the sequence of lighting the pixels is determined in such a manner that the length of an outline of the lighted pixels adjoining to the non-lighted ones is minimal, it is possible to minimize dot gains, so that the fixation of coloring material is stabilized, thereby improving the quality of outputs.

(6) Since a rectangular pattern is created as a binary-coding pattern by cutting a rectangle in a particular size from a spread of basic patterns in which the basic patterns are arranged successively in both a primary image scanning direction and a secondary image scanning direction, it is possible to create a rectangular binary-coding pattern with ease.

(7) Since a motif-pattern showing a distinctive characteristic of a rectangular pattern is cut from the rectangular pattern to represent the rectangular pattern, it is possible to reduce a memory area needed for expanding binary-coding patterns and also a storage area for storing the binary-coding pattern, thereby reducing hardware manufacturing costs as well as improving processing speed.

(8) Partly since the motif-pattern occupies a rectangular area that is measured Y in the primary scanning direction by i in the secondary scanning direction, thus being composed of Y×i pixels, and partly since Y measured in the primary scanning direction is equal to a length, measured in the primary scanning direction, of the rectangular pattern of the particular size, and partly since i measured in the secondary scanning direction is equal to a minimum quantity (the number of pixels), measured in the secondary scanning direction, essential for the rectangular area to include a complete set of lightening sequence numbers determined one for each of the pixels composing the basic pattern, it is possible to reduce the size of the binary-coding pattern, a memory area needed in binary-coding, and a storage area for storing the binary-coding pattern, thereby improving processing speed and reducing hardware manufacturing costs.

(9) Since one or more rectangles having corner points A(c, 1), B(a+c, b+1), C(0, d+1), D(a, b+d+1) are created as basic pattern shapes, where parameters a, b, c, and d are arbitrary integers satisfying n=ad+bc (n is the number of pixels having been designated), and the one, out of such rectangles, which is at an angle approximate to a basic pattern angle having been designated, is then selected as a basic pattern, it is possible to create the basic pattern shape with ease, thus facilitating creating a binary-coding pattern.

(10) Since the sequence of lighting the pixels of the basic pattern is determined based on a weight which has been assigned to each of the pixels by an arithmetic operation according to a distance between a predetermined point in the basic pattern and each of the pixels, it is possible to determine the sequence of lighting the pixels with ease, thus also facilitating the creating of a binary-coding pattern.

(11) Since a rectangular pattern is created by an arithmetic operation such that size (X) of the rectangular pattern measured in a secondary scanning direction satisfies:

$$\text{size}(X) = \max((n \div gcd(b,n)), (n \div gcd(d,n)))$$

and size (Y) of the rectangular pattern measured in a primary scanning direction satisfies:

$$\text{size}(Y) = \max((n \div gcd(a,n)), (n \div gcd(c,n))),$$

it is possible to create the rectangular pattern with ease, thus also facilitating creating a binary-coding pattern.

Other objects and further features of the present invention will be apparent from the following detailed description when read in conjunction with the accompanying drawings.

BRIEF DESCRIPTION OF THE DRAWINGS

FIG. 7 is a list in which screen angles of a rectangle determined by parameters a, b, c, d, are listed in comparison with predetermined angles;

DESCRIPTION OF THE PREFERRED EMBODIMENT(S)

One preferred embodiment of the present invention will now be described with reference to the accompanying drawings.

(A) Description of One Embodiment

Figure 1:
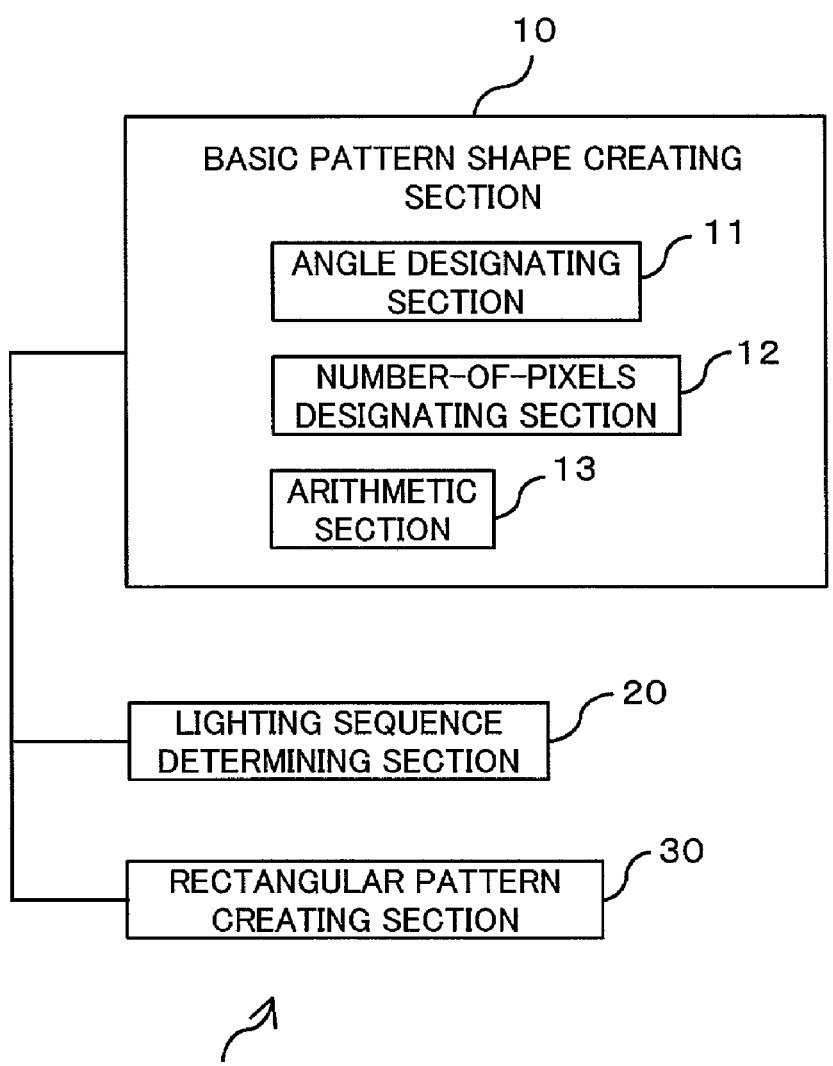
FIG. 1 is a block diagram showing a binary-coding pattern creating apparatus which employs a binary-coding pattern creating method of one embodiment of the present invention.
Figure 2:
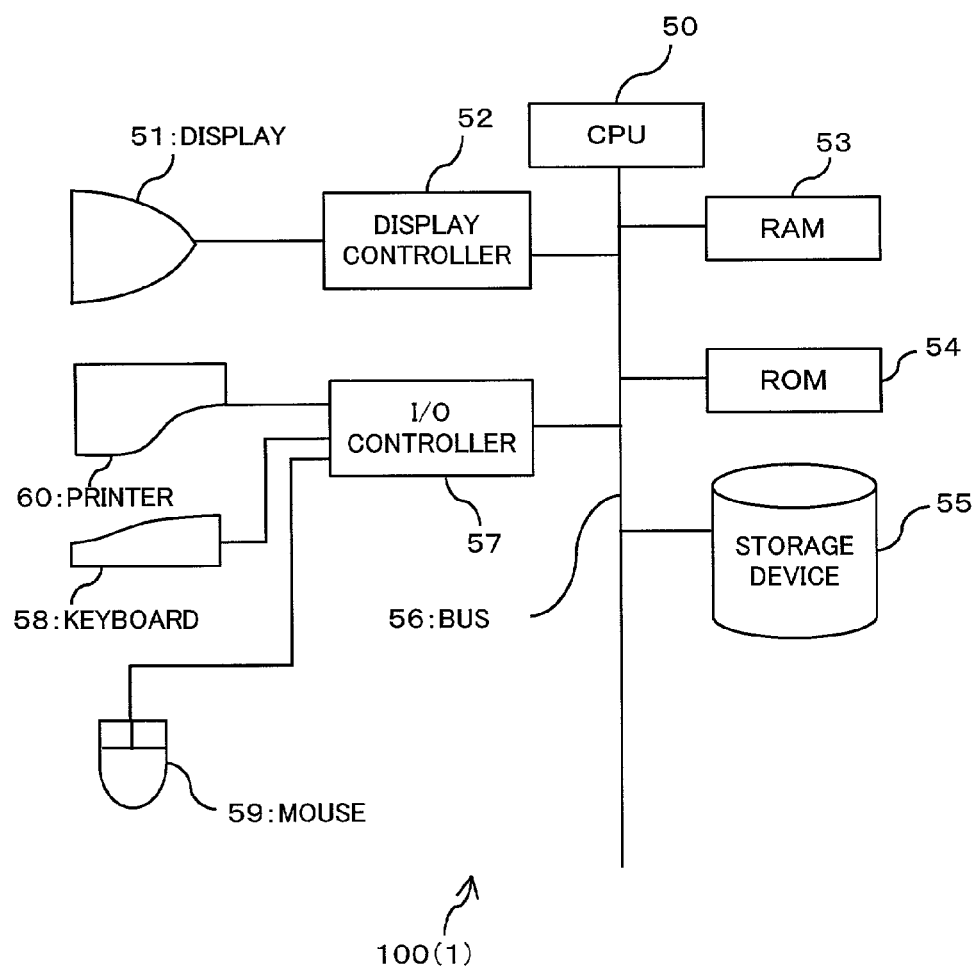
FIG. 2 is a diagram showing hardware structure of the binary-coding pattern creating apparatus of FIG. 1.

FIG. 1 and FIG. 2 show a binary-coding pattern creating apparatus which employs a binary-coding pattern creating method of one embodiment of the present invention: FIG. 1 is a function schematic; FIG. 2 is a hardware structure schematic. A binary-coding pattern creating apparatus 1 of the present embodiment creates a centralized type of binary-coding pattern that is used by printers or high-resolution printing devices for converting (binarizing/binary-coding) a multilevel image into a binary one.

For example, computer system 100 of FIG. 2 serves as binary-coding pattern creating apparatus 1 by means of executing a binary-coding pattern creating program stored in ROM 54 or storage device 55.

Computer system 100, as shown in FIG. 2, includes CPU 50, display 51, display controller 52, RAM 53, ROM 54, storage device 55, bus 56, I/O controller 57, keyboard 58, mouse 59, and printer 60.

CPU 50 executes various types of arithmetic operations and controlling in computer system 100. More precisely, CPU 50 executes varying programs stored in ROM 54 and storage device 55.

RAM 53 is for use by CPU 50, when carrying out arithmetic operations, to temporarily expand and store data therein. ROM 54 and storage device 55 stores various programs, data, and the like. Display controller 52 controls display 51, which shows various information on its screen in response to instructions received from display controller 52.

I/O controller 57 controls various types of I/O (input/output) devices such as printer 60, keyboard 58, and mouse 59. Keyboard 58 and mouse 59 are used for inputting various data therethough. Printer 60 prints by fixing a coloring material (ink, toner, etc.) onto a print medium (paper sheet, etc.).

In computer system 100, CPU 50 executes a binary-coding pattern creating program stored in ROM 54 or storage device 55 so as to serve as basic pattern shape creating section 10, lighting sequence determining section 20, and rectangular pattern creating section 30 (each described later), and thereby computer system 100 serves as binary-coding pattern creating apparatus 1.

Binary-coding pattern creating apparatus 1, as shown FIG. 1, includes basic pattern shape creating section 10, lighting sequence determining section 20, and rectangular pattern creating section 30.

Figure 3:
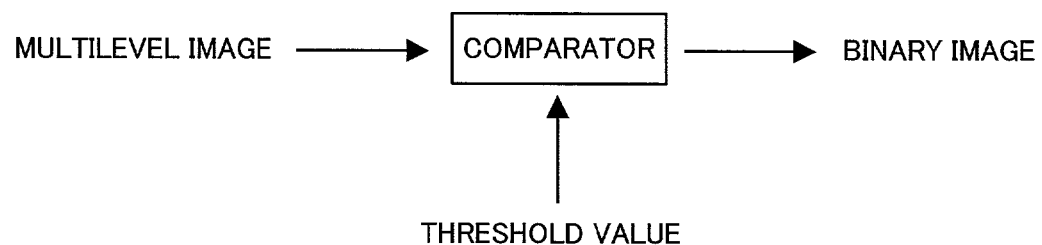
FIG. 3 is a conceptual diagram indicating a common type of binary-coding processing of a continuous tone image.

FIG. 3 is a conceptual schematic of a general type of binary-coding process of a multilevel image. As shown in FIG. 3, a comparator compares pixel values of the multilevel image with predetermined threshold values.

Figure 4:
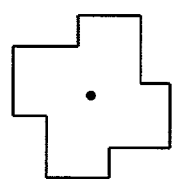
FIG. 4 is a diagram showing an example of a basic pattern shape.

A binary-coding pattern is made up of basic patterns having a particular shape. Such basic patterns are arranged successively in both a primary image scanning direction and a secondary image scanning direction. FIG. 4 depicts an example of the shape of the individual basic patterns.

Basic pattern shape creating section 10 creates the shape of basic patterns (hereinafter called "basic pattern shape"), as of FIG. 4, which compose a binary-coding pattern. As depicted in FIG. 1, basic pattern shape creating section 10 includes angle designating section 11, number-of-pixels designating section 12, and arithmetic section 13.

Angle designating section 11 designates an angle (hereinafter called "pattern angle") through which the binary-coding pattern is turned. In use, a user designates this angle (say, 30°, 45°, etc.), as necessary.

Number-of-pixels designating section 12 designates the number (n: natural number) of pixels composing a basic pattern, thereby determining the number of gray-scale levels a single halftone dot can represent and also the resolution. In use, the user designates this number (n) in advance.

Arithmetic section 13 creates a basic pattern shape by an arithmetic operation (first arithmetic operation) based on a pattern angle designated by angle designating section 11 and on the number of pixels designated by number-of-pixels designating section 12.

Arithmetic section 13 generates rectangle ABCD (FIG. 5A) based on a combination of arbitrary parameters a, b, c, and d (a, b, c, and d are integers), which satisfies an equation of n=ad+bc, where n is the number of pixels, and is designated by number-of-pixels designating section 12. The shape of this rectangle ABCD serves as a basic pattern shape.

At that time, line segments AB, AC, CD, BD are defined as follows:

Line segment AB: $ay=b(x-c)+a$
Line segment AC: $cy=-d(x-c)+c$
Line segment CD: $ay=bx+a(d+1)$
Line segment BD: $cy=-d(x-a)+(b+d+1)c$ Arithmetic section 13 creates a basic pattern such that it is made up of the pixels included in rectangle ABCD. The pixels overlaying line segments AB, AC, CD, BD, are treated in accordance with the following rules (1) through (5).

Assuming coordinate points are integral grid points of an x-y coordinate system (see FIG. 5A), the basic pattern includes:

(1) point A;
(2) all the points overlaying line segments AB and AC;
(3) the points overlaying line segment CD, if the y coordinate value of point B is smaller than the y coordinate value of point C;
(4) the points overlaying line segment BD, if the y coordinate value of point B is greater than the y coordinate value of point C; and
(5) none of point B, point C, and point D.

Basic patterns generated so as to meet the above five rules (1) through (5) are advantageous in that they can be arranged successively in a primary image scanning direction and a secondary image scanning direction, maintaining well-preserved continuity between plural halftone dots.

Figure 5A:
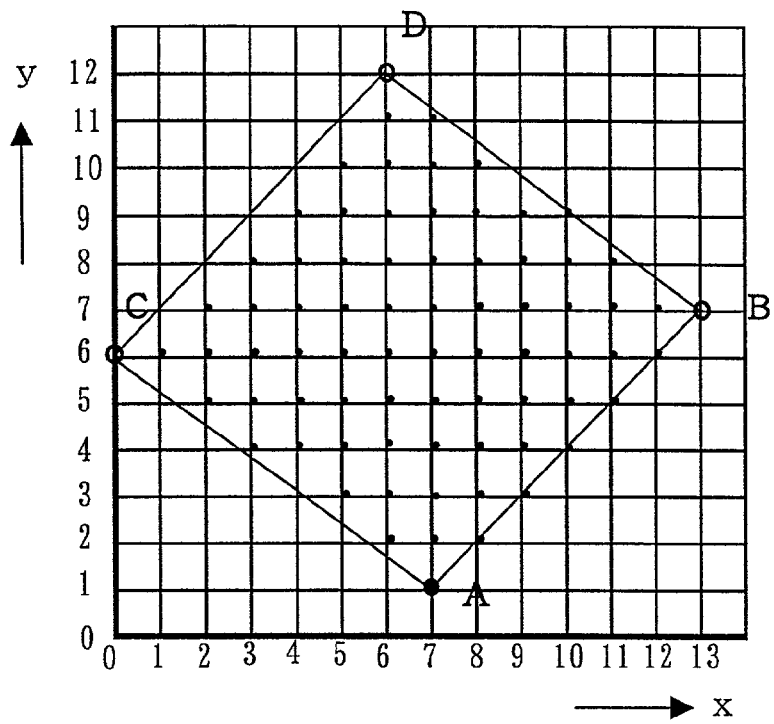
FIG. 5A is a diagram depicting a shape of a rectangle ABCD described by coordinate values.
Figure 5B:
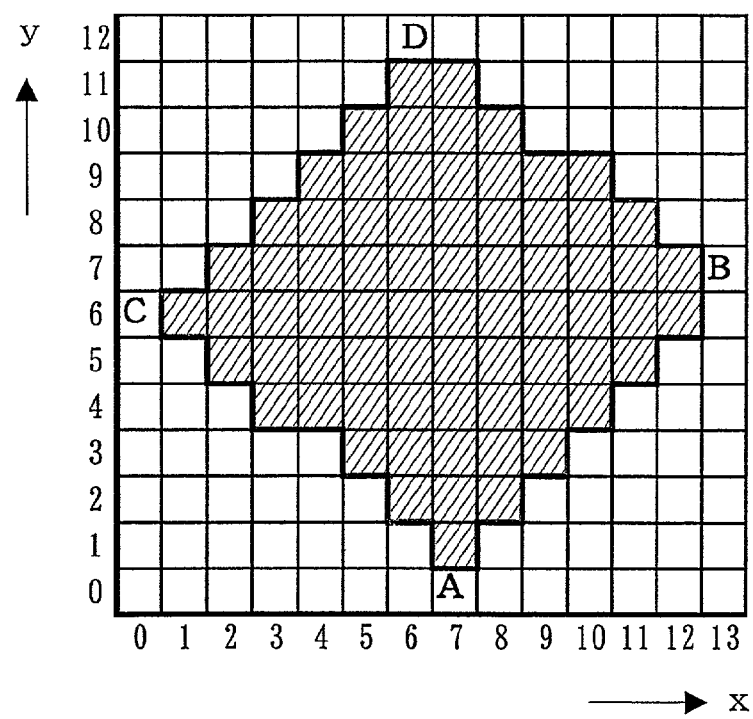
FIG. 5B is a diagram depicting a shape of a rectangle ABCD described by pixels.

FIG. 5A and FIG. 5B each show an example of rectangle ABCD. FIG. 5A shows the shape of rectangle ABCD with use of coordinate values, while FIG. 5B, with use of pixels. In these FIG. 5A and FIG. 5B, parameters (a, b, c, d)=(6, 6, 7, 5).

The above rules (1) through (5) are applied to rectangle ABCD that has corner points A(7, 1), B(13, 7), C(0, 6), and D(6, 12), as shown in FIG. 5A, so that a basic pattern composed of the pixels placed as shown in FIG. 5B is resultantly generated.

More precisely, basic pattern shape creating section 10 calculates the coordinates of point A, point B, point C, and point D, based on parameters a, b, c, and d, which are calculated in the manner described above, so as to designate a basic pattern shape.

In order to generate a uniform binary-coding pattern, the following condition must be satisfied: a straight line formed by connecting any two adjoining points out of the four points A, B, C, and D, is to be parallel with another straight line formed by connecting the remaining two points. This condition indicates that rectangle ABCD should be a parallelogram. The coordinates of the four points A, B, C, and D that are given to meet this condition are designated by A(c, 1), B(a+c, b+1), C(0, d+1), D(a, b+d+1), as described above.

In other words, a basic pattern shape is designated by arbitrary parameters a, b, c, and d which satisfies an equation of n=ad+bc (n is the number of pixels designated by number-of-pixels designating section 12), and a rectangle having the following corner points is resultantly created: point A(c, 1), point B(a+c, b+1), C(0, d+1), and D(a, b+d+1).

In this instance, since those parameters a, b, c, and d can take various combinations of values, one or more types of rectangles ABCD are expected to be created according to such varying parameter values.

Out of those plural types of rectangles ABCD, the one whose angle (an angle made by any one of the line segments AB, CD, AC, and BD) is the closest to a binary-coding pattern angle, which has been designated by angle designating section 11, is selected as a basic pattern, and parameters a, b, c, and d that make up the above-specified rectangle ABCD are recorded.

That is, basic pattern shape creating section 10 creates, as a basic pattern shape, one or more rectangles which have the following corner points: point A(c, 1); point B(a+c, b+1); point C(0, d+1); and point D(a, b+d+1), where parameters a, b, c, and d are arbitrary integers satisfying an equation of n=ad+bc (n is the number of pixels, which is designated by number-of-pixels designating section 12), and then, the one, out of thus created rectangles, which is at an angle approximate to a binary-coding pattern angle designated by angle designating section 11, is selected as the basic pattern.

Figure 6:
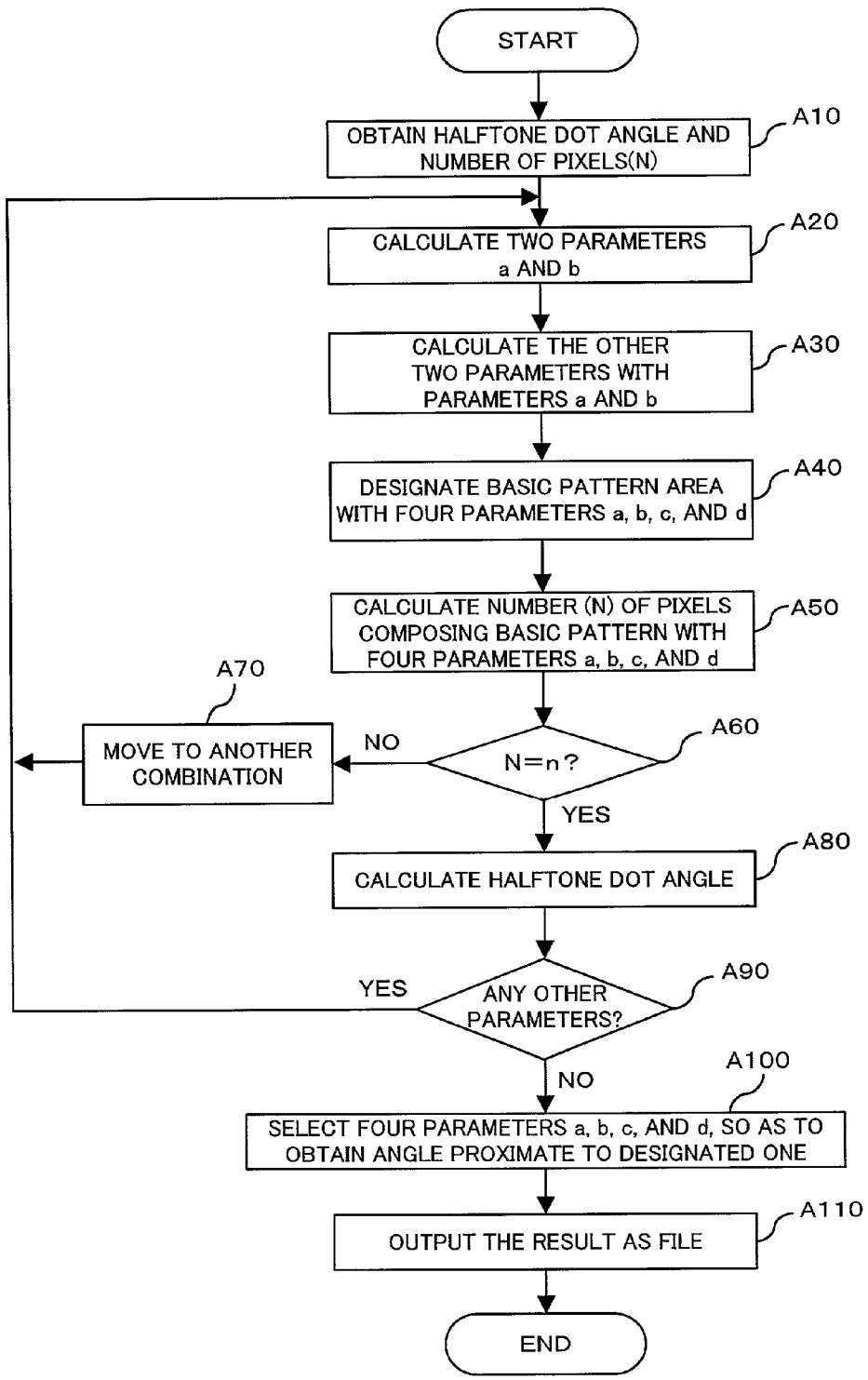
FIG. 6 is a flowchart indicating a method of creating the basic pattern shape by an arithmetic section.

A method of creating a basic pattern shape by arithmetic section 13 will now be described hereinbelow with reference to the flowchart (step A10 through step A110) of FIG. 6.

Arithmetic section 13 obtains a halftone dot angle and the number (n) of pixels, which have been designated by angle designating section 11 and number-of-pixels designating section 12, respectively (step A10), and then arbitrarily selects two integers a and b which are smaller than n (or within a predetermined range) (step A20). Arithmetic section 13 calculates all the integers c and d that satisfy n=ad+bc (or within a predetermined range), with respect to the above integers a and b (step A30).

Arithmetic section 13, based on the thus obtained parameters a, b, c, and d, designates rectangle ABCD formed by four points A(c, 1), B(a+c, b+1), C(0, d+1), D(a, b+d+1) as a basic pattern area (step A40).

Arithmetic section 13 then counts the number of pixels included in rectangle ABCD (step A50).

After that, arithmetic section 13 evaluates whether or not the number (N) of pixels included in rectangle ABCD is identical to the number (n) of pixels that is obtained in step A10 (step A60). If the evaluation yields a negative result (NO route of step A60), the procedure returns to step A20 for selecting another combination of parameters a, b, c, and d (step A70).

Otherwise if the evaluation result is positive (YES route of step A60), arithmetic section 13 calculates an angle of rectangle ABCD, or a screen angle (step A80).

Arithmetic section 13 evaluates whether or not any other combination of parameters a, b, c, and d, remains (step A90). If the evaluation result is positive (YES route of step A90), arithmetic section 13 returns to step A20. Otherwise, if the result is negative (NO route of step A90), the angle of rectangle ABCD formed by every combination of parameters thus obtained is compared with the screen angle that has been designated in step A10. The arithmetic section 13 then selects one of the combinations of parameters a, b, c, and d, in such a manner that the screen angle the closest to the designated one is formed by the selected parameters (step A100).

FIG. 7 lists a variety of screen angles of rectangle-shaped halftone dots, which angles are determined by parameters a, b, c, and d, in comparison with a previously designated screen angle. In the example of FIG. 7, the designated screen angle is 45°; the designated number of pixels composing a basic pattern is 72. The list shows top 10 combinations of such parameters that would minimize an error (slope) of the screen angle (in radian).

Arithmetic section 13, as shown in FIG. 7, comparatively analyses every combination of parameters a, b, c, and d, so as to select one of the combinations that will provide a screen angle the closest to the designated one.

Arithmetic section 13 then outputs the selected parameters a, b, c, and d as a file, and stores the file in storage device 55 (step A110).

Figure 8:
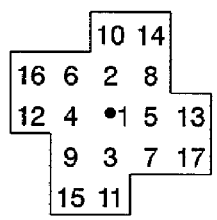
FIG. 8 is a diagram showing an example of a lighting sequence in which pixels are lighted.

In a binary-coding pattern, the sequence of fixing (hereinafter also called "lighting") coloring material (ink, toner, etc.) on the pixels of a basic pattern, depending on their gray-scale levels, is determined. FIG. 8 depicts an example of the lighting sequence.

Lighting sequence determining section 20 determines the lighting sequence of the pixels composing a basic pattern such as that in FIG. 8. The lighting sequence is determined based on a distance between each pixel and a predetermined point (for example, the barycenter or the center of the basic pattern) in the basic pattern.

Lighting sequence determining section 20 determines the lighting sequence in such a manner that the pixels are lighted sequentially from the one nearer to the predetermined point of the basic pattern, and that the length of an outline of the lighted pixels adjoining to the non-lighted ones is minimal.

Figure 9:
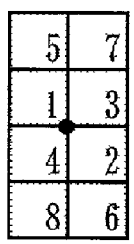
FIG. 9 is a diagram showing an example of a lighting sequence which is determined in such a manner that the length of an outline of the lighted pixels adjoining the non-lighted ones is minimal.
Figure 10:
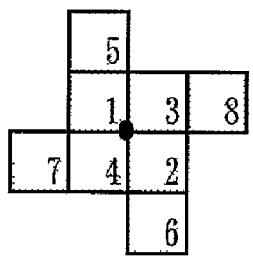
FIG. 10 is a diagram showing an example of a lighting sequence which is determined without obeying the manner indicated in FIG. 9.

FIG. 9 and FIG. 10 each show only the pixels to which lighting sequence numbers are assigned. FIG. 9 shows an example where the lighting sequence is determined in such a manner that the length of an outline of the lighted pixels adjoining the non-lighted ones is minimal, while FIG. 10 shows an example where the lighting sequence is determined without following that manner.

In the example of FIG. 9, where the lighting sequence determining section 20 determines the lighting sequence in such a manner that the pixels are lighted sequentially from the one nearer to a predetermined point of a basic pattern, and that the length of an outline of the lighted pixels adjoining to the non-lighted ones is minimal, dot gain can be more reduced than in the example of FIG. 10.

More precisely, lighting sequence determining section 20 designates a distance between a predetermined point of a basic pattern and each of the pixels composing the basic pattern, with the following formula (1) of a weighting factor W. The lighting sequence order numbers are assigned to the pixels sequentially from the one with a greater weighting factor W.

$$W = p - q \times \cos\alpha - r \times \cos\beta \qquad (1)$$

where $\alpha = x - \text{PXDOT}$ and $\beta = y - \text{PYDOT}$ in case where the coordinate of a pixel included in the basic pattern is expressed as (x, y), and also, the center/barycenter (predetermined point) of the basic pattern is expressed as (PXDOT, PYDOT).

In addition, p, q, and r are the values (coefficients) each being appropriately set, and take non-negative real numbers. Both q and r are coefficients for designating the shape of a halftone dot to be created; q takes the greater value, the longer in the x-direction the oval shape of the halftone dot becomes, while r takes the greater value, the longer in the y-direction the oval shape of the halftone dot becomes. If q=r, the halftone dot to be created will have a circular shape. p, which is a numerical value appropriately set in such a manner that an arithmetic operation result of formula (1) would take no negative value, makes it easy to perform any processing (say, sorting) of the thus obtained weight (W).

In this manner, lighting sequence determining section 20 determines the sequence of lighting the pixels based on weights (W) assigned one for each pixel by an arithmetic operation according to a distance between each pixel of a basic pattern and a predetermined point.

Figure 11:
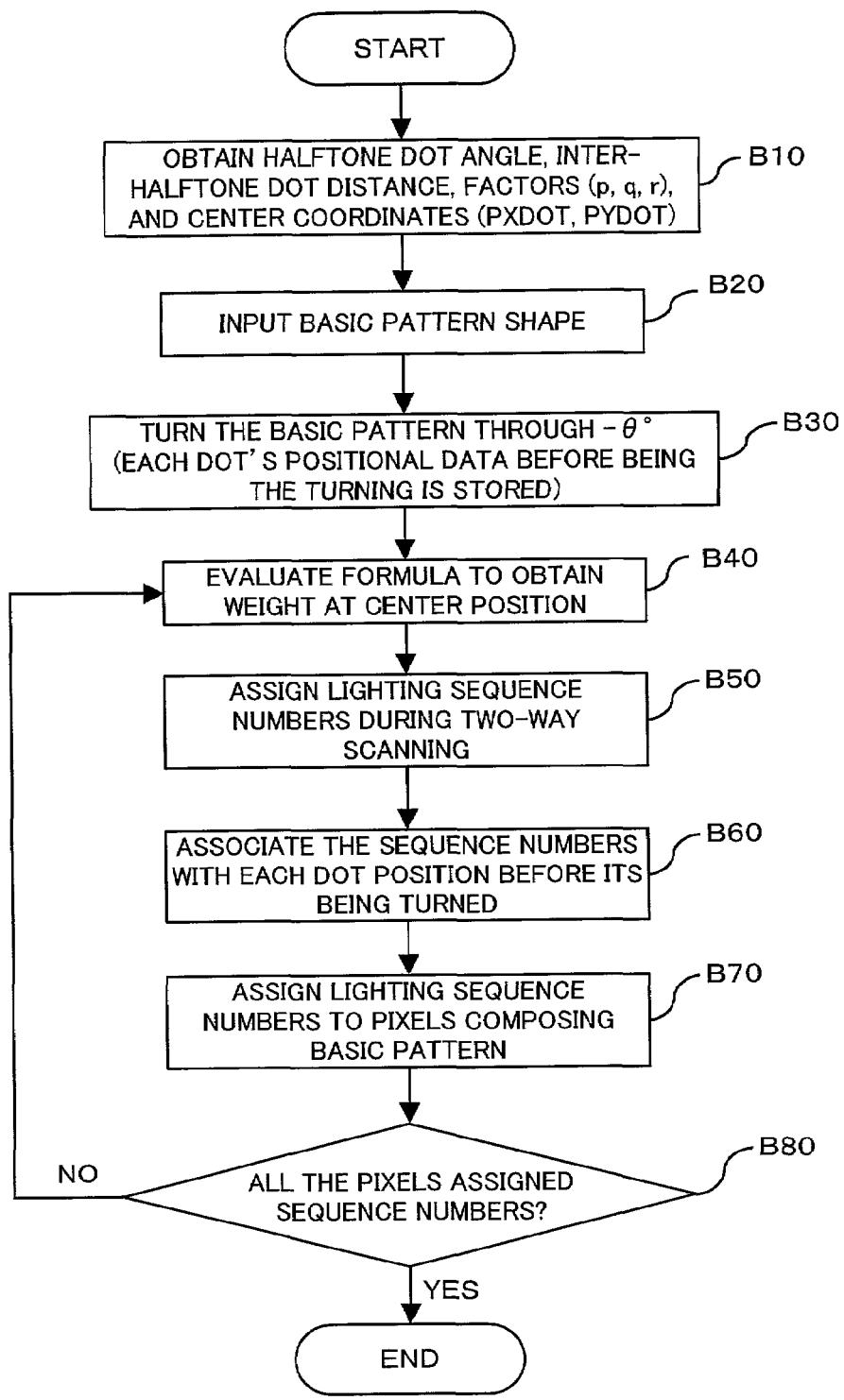
FIG. 11 is a flowchart indicating one method of determining the lighting sequence by a lighting sequence determining section.

A procedure for determining the lighting sequence by lighting sequence determining section 20 will now be described hereinbelow with reference to FIG. 12 and the flowchart (step B10 through step B80) of FIG. 11.

Figure 12A:
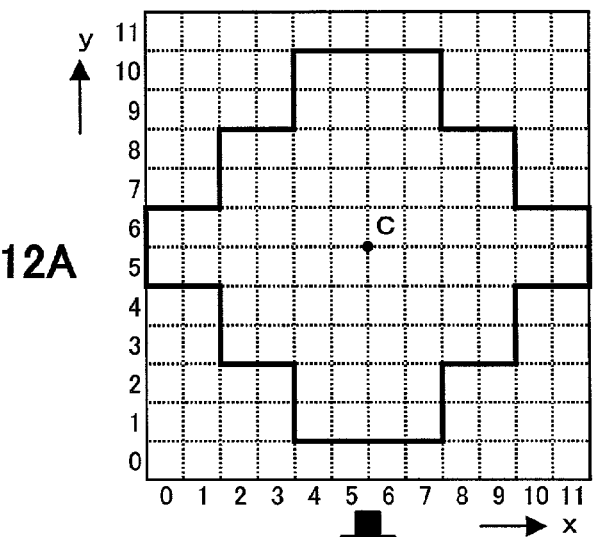
FIG. 12A is a diagram depicting a basic pattern in which the lighting sequence is halfway determined.
Figure 12B:
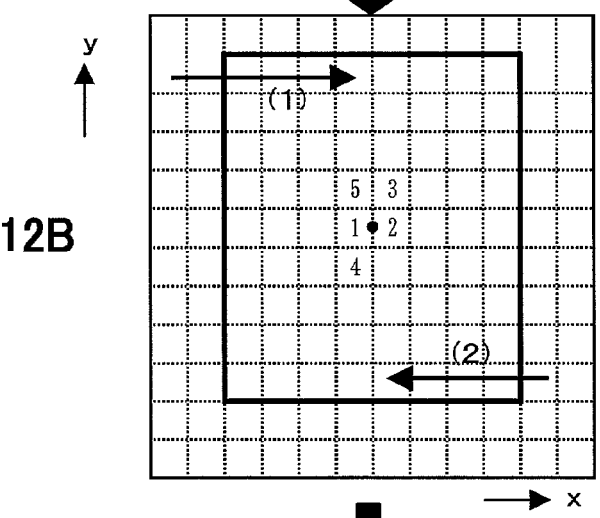
FIG. 12B is a diagram depicting a basic pattern which is turned through −θ°.
Figure 12C:
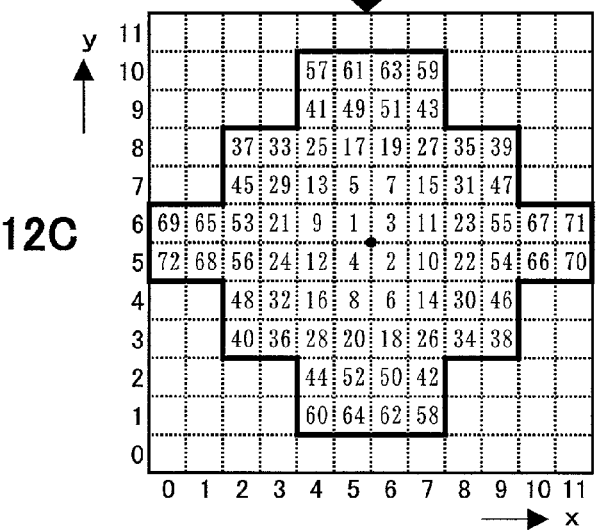
FIG. 12C is a diagram depicting a basic pattern in which the lighting sequence is determined.

FIG. 12A through FIG. 12C depict the procedure for determining the sequence of lighting the pixels composing a basic pattern. FIG. 12A shows a basic pattern in which the lighting sequence is partly determined; FIG. 12B shows the basic pattern of FIG. 12A that is turned through −θ°; and FIG. 12C shows the basic pattern of FIG. 12A in which the lighting sequence is completely determined. In these examples of FIG. 12A through FIG. 12C, a halftone angle is 45° while the number of pixels composing the basic pattern is 72.

Firstly, lighting sequence determining section 20 obtains a halftone angle, an inter-halftone dot distance, and factors p, q, r, of a basic pattern shape created by basic pattern shape creating section 10, and also determines predetermined point (PXDOT, PYDOT) as the center or the barycenter of the basic pattern (step B10).

In this instance, the predetermined point (PXDOT, PYDOT) of the basic pattern shape may be either designated in advance by an operator, or calculated by lighting sequence determining section 20.

When determining of the point, if the point is situated at the center of the pixels (see FIG. 12A through FIG. 12C), its coordinates take natural numbers. Otherwise, if the point is situated on a boundary between two adjoining pixels, its coordinates take natural numbers ±0.5. For example, if the predetermined point is determined to be placed at the center point C of the basic pattern of FIG. 12A, the coordinates of the predetermined point are (5.5, 5.5).

Further, lighting sequence determining section 20 calculates a distance between predetermined points of adjoining basic patterns. In the example of FIG. 12A, this distance is 8.24852814.

Next, lighting sequence determining section 20 obtains the basic pattern which has been created by basic pattern shape creating section 10 (step B20), and calculates a distance between each pixel and the predetermined point, both in a secondary image scanning direction (x-axis direction) and in a primary image scanning direction (y-axis direction). While storing this location data of each pixel before being turned, the lighting sequence determining section 20 uses an affine transformation to turn the basic pattern by an angle of −θ° around its center point, so that the basic pattern is converted back into an approximately rect-angle shape (step B30).

After that, using the above-presented formula (1), lighting sequence determining section 20 calculates the weight (W)

of each of the pixels composing the basic pattern which has been turned by an angle of −θ° (step B40).

On the basis of this weight (W), the lighting sequence determining section 20 then determines the lighting sequence (step B50).

After turning the basic pattern through −θ°, lighting sequence determining section 20 splits the basic pattern horizontally into two parts across a horizontal line that lies on the center point (predetermined point) of the basic pattern. Firstly, lighting sequence determining section 20 searches weights (W) of the pixels {their number equals to (the number of pixels composing the basic pattern÷2+1)} composing the upper half split one by one, starting from the top left one and then proceeding in a horizontal right direction. This horizontal search progresses sequentially from the top line to the bottom line, until it reaches the bottom right pixel of the basic pattern. After that, lighting sequence determining section 20 assigns lighting sequence number "1" to the pixel whose weight (W) is bigger than those of the other pixels composing the upper half of the basic pattern.

Next, lighting sequence determining section 20 searches weights (W) of the pixels {their number equals to (the number of pixels composing the basic pattern÷2+1)} composing the lower half split one by one, starting from the bottom right one and then proceeding in the horizontal left direction. This horizontal search progresses sequentially from the bottom line to the top line, until it reaches the top left pixel of the basic pattern. After that, the lighting sequence determining section 20 assigns lighting sequence number "2" to the pixel whose weight (W) is bigger than those of the other pixels composing the lower half of the basic pattern.

Likewise, lighting sequence determining section 20 provides such lighting sequence numbers to the pixels (except those to which the number has already been given) of the upper half split and the lower half split, alternately, in descending order of the weights (W) of the pixels.

At that time, if two or more of the pixels have a common weight (W) value, lighting sequence determining section 20 gives priority to the order of accessing.

Lighting sequence determining section 20, as shown in FIG. 12C, then associates the lighting sequence numbers assigned to the −θ°-turned basic pattern with a basic pattern (a non-turned basic pattern) (step B60), and thereby determines the sequence of lighting the pixels composing the (non-turned) basic pattern (step B70).

Lighting sequence determining section 20 evaluates whether or not all the pixels of the basic pattern have been assigned the lighting sequence numbers (step B80). If the evaluation yields negative results (NO route of step B80), lighting sequence determining section 20 returns to step B40. Otherwise, if the evaluation results are positive (YES route of step B80), lighting sequence determining section 20 ends the procedure.

Alternatively, lighting sequence determining section 20 might determine the sequence of lighting the pixels composing a basic pattern based on a distance between a predetermined point in the basic pattern and each of the pixels and on a particular factor (rate of flattening) relevant to the distance.

Specifically, lighting sequence determining section 20 calculates weights (W) of the pixels using the following formula (2), based on a distance between a predetermined point in the basic pattern and each of the pixels and on a particular factor {rate of flattening(E)} relevant to the distance. Lighting sequence determining section 20 then assigns the lighting sequence numbers to the pixels sequentially from the one having a greater weight (W).

$$W = p - E \times \cos \alpha - (p-E) \times \cos \beta \qquad (2)$$

where α=x−PXDOT and β=y−PYDOT in case where the coordinate of a pixel included in the basic pattern is expressed as (x, y), and also, the center/barycenter (predetermined point) of the basic pattern is expressed as (PXDOT, PYDOT).

In addition, both p and E are values (coefficients) each being appropriately set.

E is a coefficient (the rate of flattening) for designating the shape of a halftone dot to be created, and is a floating-point number sufficing 0.0<E≦p. Here, if p=2.0 and E=1.0, a halftone dot has a circular shape. The closer to 0.0 or 2.0 the rate of flattening (E) is, the narrower the shape of a halftone dot is. p is a numerical value which is appropriately set in such a manner that an arithmetic operation result of formula (2) would take no negative value, thus making it easy to perform any processing (say, sorting) of a weight (W) resultantly obtained.

Figure 13:
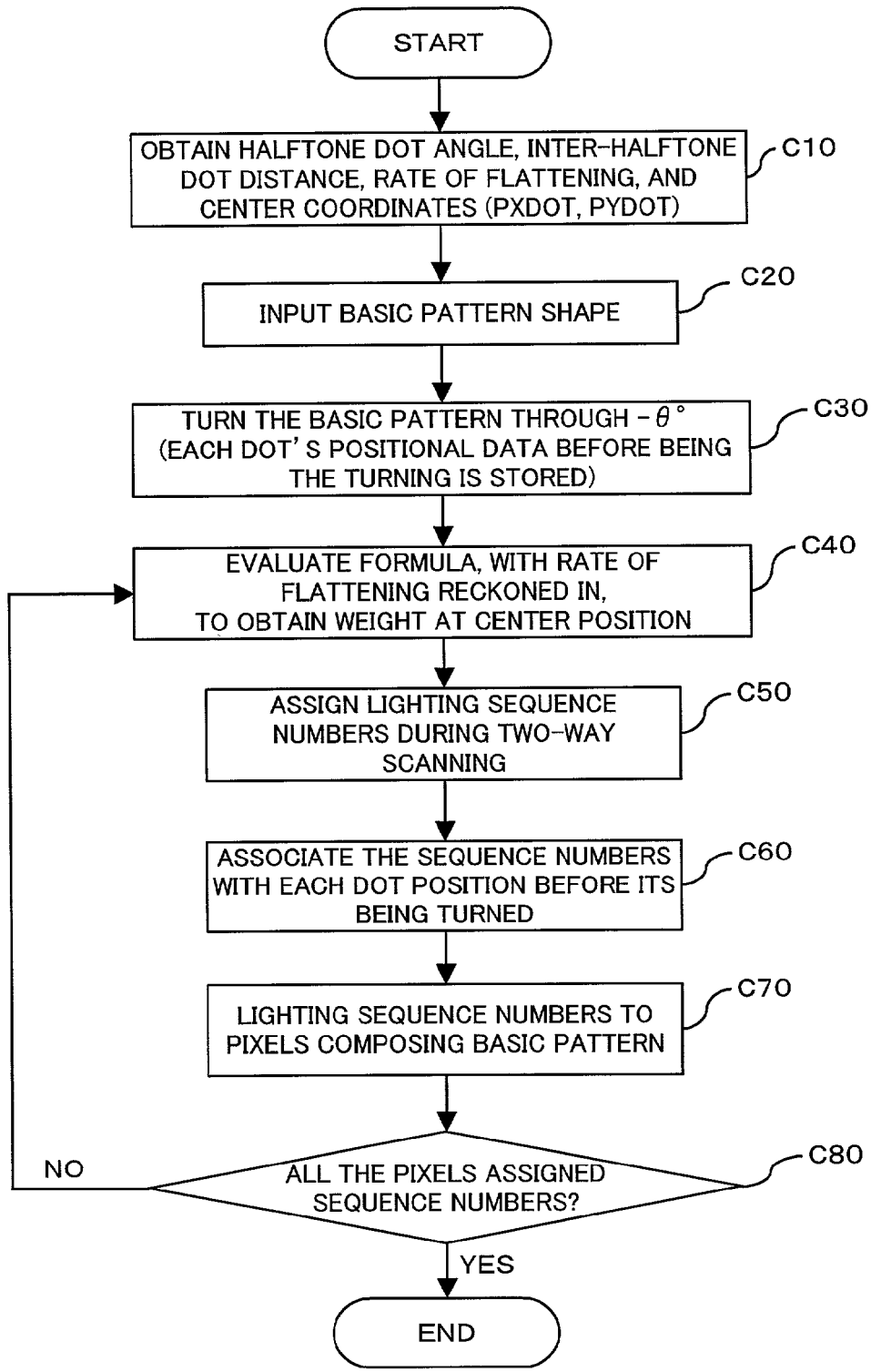
FIG. 13 is a flowchart indicating another method of determining the lighting sequence by the lighting sequence determining section.

A description will now be made hereinbelow of another method of determining the lighting sequence by lighting sequence determining section 20 with reference to the flowchart (step C10 through C80) of FIG. 13.

Lighting sequence determining section 20 obtains a screen angle, an inter-halftone dot distance, and factors p, q, r, used in creating a basic pattern shape by basic pattern shape creating section 10, and determines the center or the barycenter of the basic pattern shape as a predetermined point (PXDOT, PYDOT) (step C10).

In this instance, the predetermined point (PXDOT, PYDOT) of the basic pattern shape may be either designated in advance by an operator, or calculated by the lighting sequence determining section 20.

Lighting sequence determining section 20 then obtains the basic pattern created by basic pattern shape creating section 10 (step C20). While storing this location data of each pixel before the basic pattern is turned, lighting sequence determining section 20 uses an affine transformation to turn the basic pattern by an angle of −θ° around its center point, so that the basic pattern is converted back into an approximately rectangle shape (step C30).

After that, using the above-presented formula (2), lighting sequence determining section 20 calculates the weight (W), in consideration of a rate of flattening, of each of the pixels composing the basic pattern which has been turned by an angle of −θ° (step C40).

On the basis of this weight (W), lighting sequence determining section 20 then determines the lighting sequence (step C50).

After turning the basic pattern through −θ°, lighting sequence determining section 20 splits the basic pattern horizontally into two parts across a horizontal line that lies on the center point (predetermined point) of the basic pattern. Firstly, lighting sequence determining section 20 searches weights (W) of the pixels {their number equals to (the number of pixels composing the basic pattern÷2+1)} composing the upper half split one by one, starting from the top left one and then proceeding in a horizontal right direction. This horizontal search progresses sequentially from the top line to the bottom line, until it reaches the bottom right pixel of the basic pattern. After that, lighting sequence determining section 20 assigns lighting sequence number "1" to the pixel whose weight (W) is bigger than those of the other pixels composing the upper half of the basic pattern.

Next, lighting sequence determining section 20 searches weights (W) of the pixels {their number equals to (the number of pixels composing the basic pattern÷2+1)} composing the lower half split one by one, starting from the bottom right one and then proceeding in the horizontal left direction. This horizontal search progresses sequentially from the bottom line to the top line, until it reaches the top left pixel of the basic pattern. After that, lighting sequence determining section 20 assigns lighting sequence number "2" to the pixel whose weight (W) is bigger than those of the other pixels composing the lower half of the basic pattern.

Likewise, lighting sequence determining section 20 provides such lighting sequence numbers to the pixels (except those to which the number has already been given) of the upper half split and the lower half split, alternately, in descending order of the weights (W) of the pixels.

At that time, if two or more of the pixels have a common weight (W) value, lighting sequence determining section 20 gives priority to the order of accessing.

Lighting sequence determining section 20 then associates the lighting sequence numbers assigned to the $-\theta°$-turned basic pattern with a basic pattern (a non-turned basic pattern) (step C60), and thereby determines the sequence of lighting the pixels composing the (non-turned) basic pattern (step C70).

Lighting sequence determining section 20 evaluates whether or not all the pixels of the basic pattern have been assigned the lighting sequence numbers (step C80) If the evaluation yields negative results (NO route of step C80), lighting sequence determining section 20 returns to step C40. Otherwise, if the evaluation results are positive (YES route of step C80), lighting sequence determining section 20 ends the procedure.

On the basis of such a basic pattern, rectangular pattern creating section 30 creates a rectangular pattern that serves as a binary-coding pattern. More precisely, rectangular pattern creating section 30 cuts a rectangle in a particular size from a spread of basic patterns in which the basic patterns are arranged successively in both a primary image scanning direction and a secondary image scanning direction.

This is because, when converting a multilevel image into a binary image, CPU 50 expands on RAM 53 a square-shaped binary-coding pattern or a rectangle-shaped one.

Figure 14:
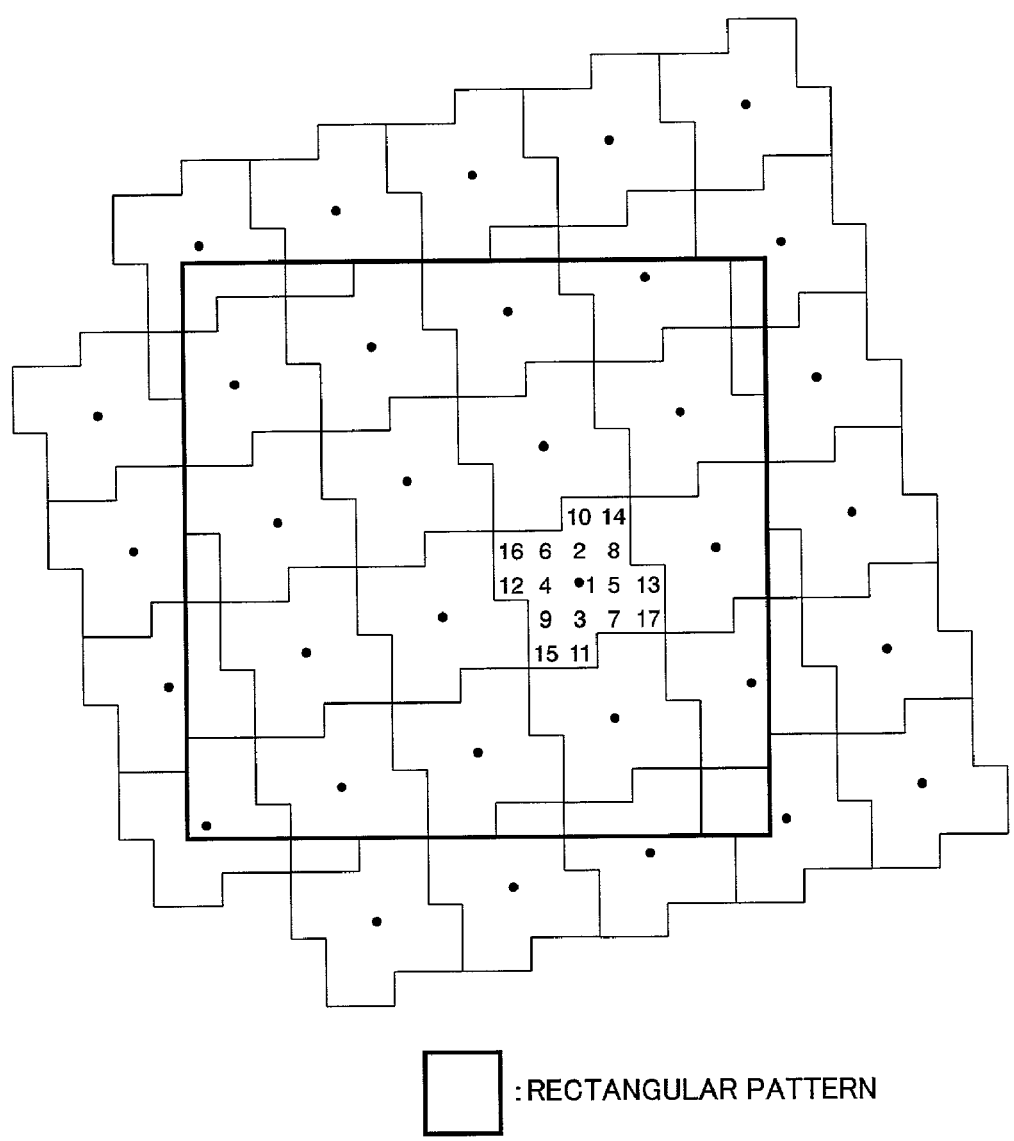
FIG. 14 is a diagram depicting an example of a rectangular pattern.

FIG. 14 shows an example of a rectangular pattern. Rectangular pattern creating section 30 cuts such a rectangular pattern as that shown in FIG. 14 in a particular size to make it serve as a binary coding pattern.

That is, rectangular pattern creating section 30 creates a rectangular binary-coding pattern (hereinafter also called rectangular pattern) of a particular size, such that, if such rectangular patterns are arranged successively both in a primary image scanning direction and in a secondary image scanning direction, halftone dots of a common shape are evenly spaced at a common angle.

Specifically, rectangular pattern creating section 30 calculates the sizes of a rectangular pattern to be created both in a secondary image scanning direction (size (X) in units of the number of pixels) and in a primary image scanning direction (size (Y) in units of the number of pixels), using the following formula (3) and formula (4), respectively.

$$\text{size}(X) = \max((n \div gcd(b,n)), (n \div gcd(d,n))) \quad (3)$$

$$\text{size}(Y) = \max((n \div gcd(a,n)), (n \div gcd(c,n))) \quad (4)$$

where n is the number of pixels composing a basic pattern, and is designated by number-of-pixels designating section 12. a, b, c, and d, are parameters calculated by arithmetic section 13. gcd is a greatest common divisor; for example, "gcd(a,n)" means the greatest common divisor of a and n.

In addition, "max( . . . , . . . )" means to choose the greater one of the two numerical values enclosed in parentheses; for example, "size(X)=max((n÷gcd(b,n),(n÷gcd(d,n))" means to choose the greater one of "n÷gcd(b,n)" and "n÷gcd(d,n)".

Rectangular pattern creating section 30 arranges basic patterns successively both in a primary image scanning direction and in a secondary image scanning direction so as to generate a spread of basic patterns. Rectangular pattern creating section 30 cuts a rectangular area that is measured size (X) from an initial point arbitrarily given on the spread of basic patterns in a secondary scanning direction by size (Y) in the primary scanning direction, thereby creating a rectangular pattern of a particular size to serve as a binary-coding pattern.

Figure 15:
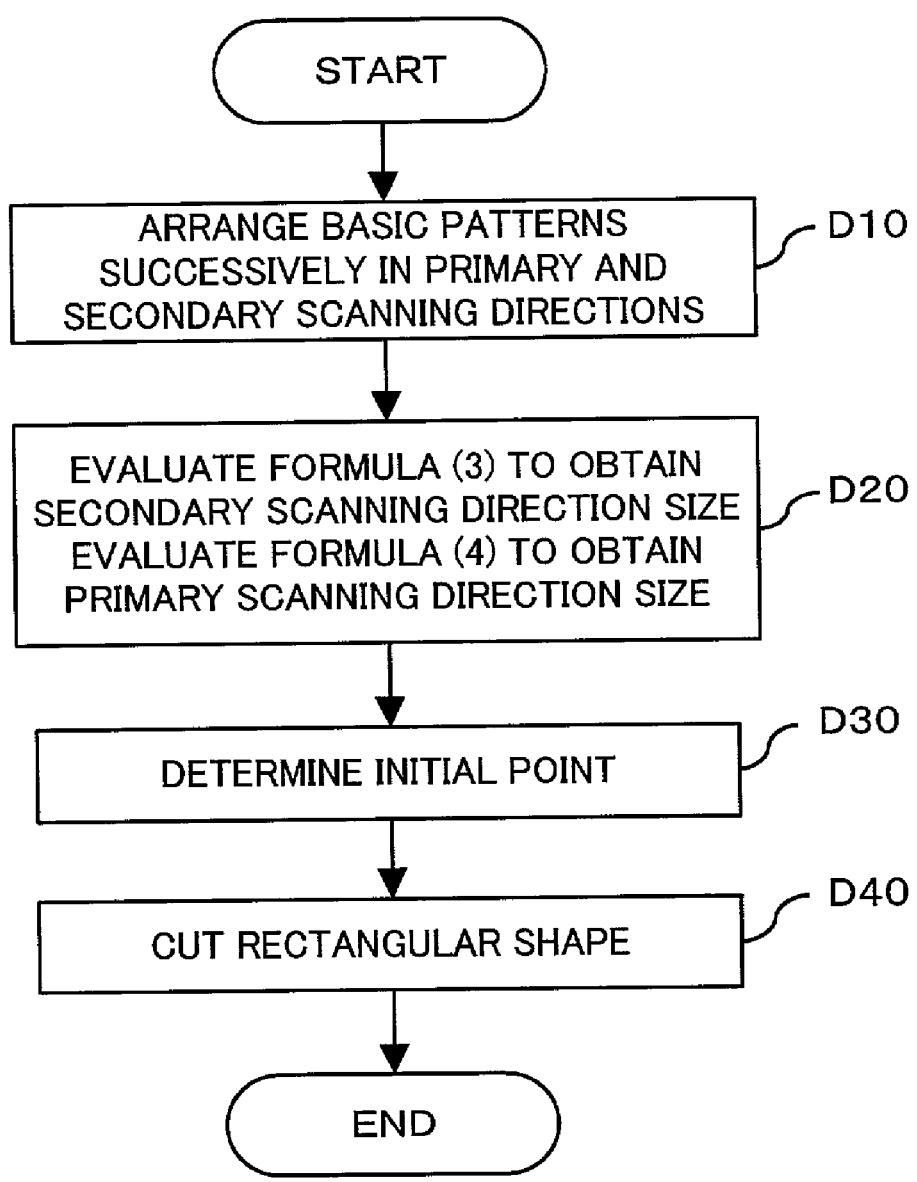
FIG. 15 is a flowchart indicating a method of creating the rectangular pattern of FIG. 14 by a rectangular pattern creating section.

A description will now be made hereinbelow of a method of creating a rectangular pattern by rectangular pattern creating section 30 with reference to the flowchart (step D10 through D40) of FIG. 15.

After arranging basic patterns successively both in a primary image scanning direction and in a secondary image scanning direction (step D10), rectangular pattern creating section 30 calculates size (X) and size (Y) using aforementioned formula (3) and formula (4), respectively (step D20).

Rectangular pattern creating section 30 then determines an arbitrary initial point (step D30), and cuts a rectangular area that is measured size (X), from the initial point, in a secondary scanning direction by size (Y) in the primary scanning direction, thereby creating a rectangular pattern (step D40).

For example, assuming basic pattern-forming parameters (a, b, c, d)=(6, 6, 7, 5), size (X) and size (Y) are given by the above formula (3) and formula (4) as follows:

$$\text{Size}(X) = \max(((72 \div gcd(6,72)), (72 \div gcd(5,72))) = 72$$

$$\text{Size}(Y) = \max(((72 \div gcd(6,72)), (72 \div gcd(7,72))) = 72$$

That is, after determining an arbitrary initial point, rectangular pattern creating section 30 extracts a rectangular area that is measured 72 pixels in the primary scanning direction by 72 pixels in the secondary scanning direction, thus being composed of 5184 pixels, as a rectangular pattern.

Figure 16A:
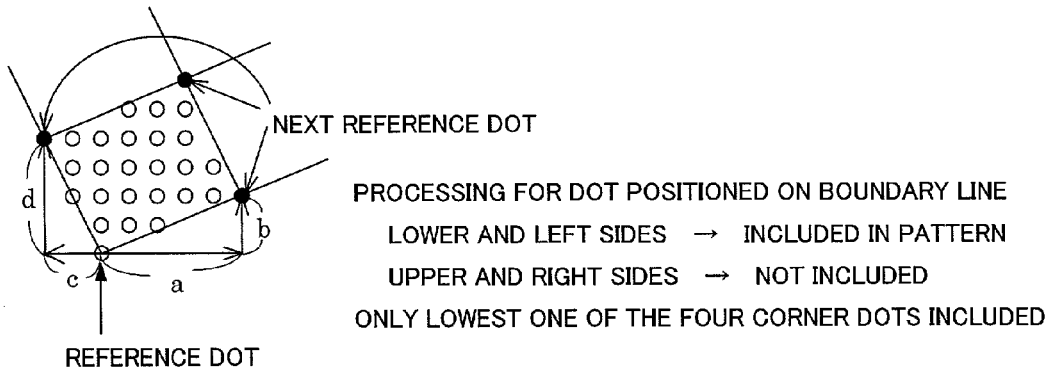
FIG. 16A is a diagram showing a basic pattern for use in proving the rectangular pattern.
Figure 16B:
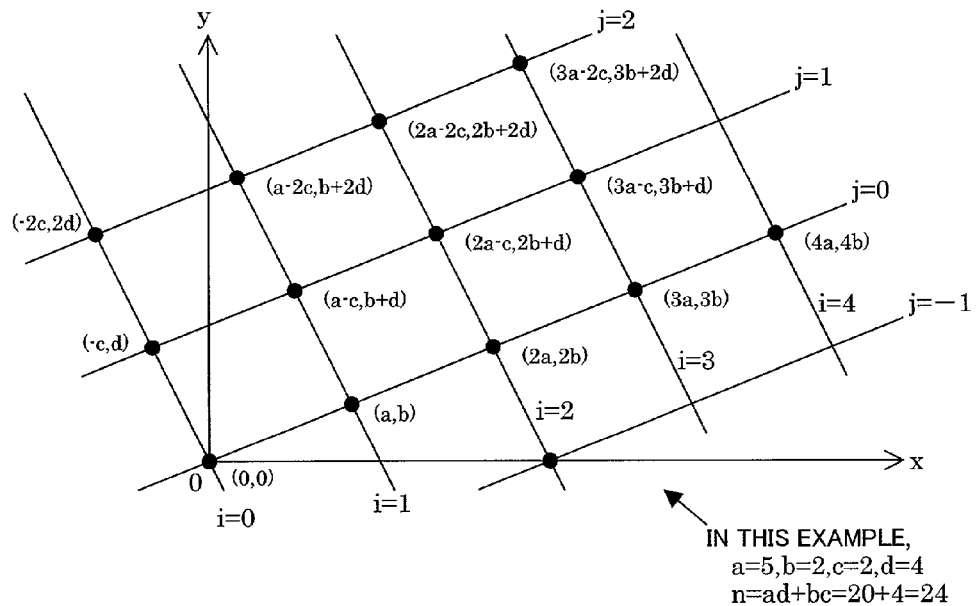
FIG. 16B is a diagram illustrating an example in which the basic patterns of FIG. 16A are arranged successively on a plane.

Here, it will be proved hereinbelow, with reference to FIG. 16A and FIG. 16B, that a rectangular pattern given by formula (3) and formula (4) can be arranged successively both in a primary image scanning direction and in a secondary image scanning direction, so as to cover a given plane. FIG. 16A shows a unit of basic pattern for use in probing the rectangular pattern, while FIG. 16B shows an example where such basic patterns are laid successively (expanded) on the plane.

There is given a basic pattern such as that defined in FIG. 16A with four parameters a, b, c, d, determining the boundaries between the basic patterns and also the number (n) of dots included in a single basic pattern.

At that time, the dots positioned on the boundaries are to be processed as follows: those on the lower side and the left side are included in the basic pattern; those on the upper side and the right side are not included in a basic pattern. In the example of FIG. 16B, a=5, b=2, c=2, d=4, n=24.

Here, the x and y coordinates of dots designated by (i, j) is given by the following formulas:

x coordinate: ia−jc y coordinate: ib−jd

Accordingly, in order to cover all the plane with rectangular patterns, it is necessary to obtain the minimum value of (ia−jc) where the y coordinate (ib+jd)=0, and also necessary to obtain the minimum value of (ib+jd) where the x coordinate (ia−jc)=0. Hence, $$ib + jd = 0 \Rightarrow i = -\frac{d}{b}j \quad \text{[Formula 1]}$$

Here, $$ia - jc = -\frac{d}{b}j \cdot a - jc \quad \text{[Formula 2]}$$
$$= -j \cdot \frac{(ad + bc)}{b}$$
$$= -j \cdot \frac{n}{b} (\because ad + bc = n)$$

Accordingly, assuming $$j = -\frac{b}{d}i \quad \text{[Formula 3]}$$

the following is given:

$$ia - jc = ia + \frac{b}{d}i \cdot c = i \cdot \frac{1}{d}(ad + bc) = i \cdot \frac{n}{d} \quad \text{[Formula 4]}$$

Here, since both i and j must be integers, gcd(jd, b)=b, gcd(ib, d)=d.

Since ib−jd=0, $i=-jd/b$ where i is an integer, and jd>b and also jd divided by b yields zero remainder.

Hence the greatest common divisor of jd and b must be b.

Likewise, since ib+jd=0, $j=-ib/d$ where j is an integer (regardless of its sign), and ib>d and also jb divided by d yields zero remainder.

Hence the greatest common divisor of jb and d must be d.

In view of these, where both n/b and n/d are integers, the minimum value of $$-j \cdot \frac{n}{b}, i \cdot \frac{n}{d} \quad \text{[Formula 5]}$$

should be obtained, and thus the minimum value is given by $$\max\left(\frac{n}{\gcd(b, n)}, \frac{n}{\gcd(d, n)}\right) \quad \text{[Formula 6]}$$

The like is true for the y direction. Hence, a minimum-sized rectangular pattern, which is a binary-coding pattern that realizes the same binary-coding as that carried out by a basic pattern designated by parameters a, b, c, d, has the size (the number of pixels) in the secondary image scanning direction as given by $$\max\left(\frac{n}{\gcd(b, n)}, \frac{n}{\gcd(d, n)}\right) \quad \text{[Formula 7]}$$

Likewise, the size (the number of pixels) of the minimum-sized rectangular pattern in the primary image scanning direction is given by $$\max\left(\frac{n}{\gcd(a, n)}, \frac{n}{\gcd(c, n)}\right) \quad \text{[Formula 8]}$$

For example, in a basic pattern designated by parameters (a, b, c, d)=(5, 2, 2, 4), assuming the secondary image scanning direction size=H and the primary image scanning direction size=V, $$H \times V = \max\left(\frac{24}{\gcd(2, 24)}, \frac{24}{\gcd(4, 24)}\right) \times \quad \text{[Formula 9]}$$
$$\max\left(\frac{24}{\gcd(5, 24)}, \frac{24}{\gcd(2, 24)}\right)$$
$$= \max\left(\frac{24}{2}, \frac{24}{4}\right) \times \max\left(\frac{24}{1}, \frac{24}{2}\right)$$
$$= 12 \times 24$$

Otherwise, if parameters (a, b, c, d)=(7, 2, 4, 8), $$H \times V = \max\left(\frac{64}{\gcd(2, 64)}, \frac{64}{\gcd(8, 64)}\right) \times \quad \text{[Formula 10]}$$
$$\max\left(\frac{64}{\gcd(7, 64)}, \frac{64}{\gcd(4, 64)}\right)$$
$$= \max\left(\frac{64}{2}, \frac{64}{8}\right) \times \max\left(\frac{64}{1}, \frac{64}{4}\right)$$
$$= 32 \times 64$$

Here, rectangular pattern creating section 30 may cut a motif-pattern, showing a distinctive characteristic of a rectangular pattern, from the rectangular pattern, which has been generated by cutting a rectangular pattern in the size calculated using the above formulas (3) and (4), so as to make it represent the rectangular pattern.

At that time, rectangular pattern creating section 30 cuts a rectangular area measured Y in a primary image scanning direction by i in a secondary image scanning direction, thus being composed of Y×i pixels, as a motif-pattern.

Y measured in the primary scanning direction of the motif-pattern is equal to the length, measured in the primary scanning direction, of the rectangular pattern of the particular size, while i measured in the secondary scanning direction of the motif-pattern is a minimum quantity (the number of pixels), measured in the secondary scanning direction, essential to the rectangular area to include a complete set of lightening sequence numbers (numeral values indicating the sequence of lighting all the pixels composing the basic pattern), determined one for each of the pixels composing the basic pattern.

Figure 17:
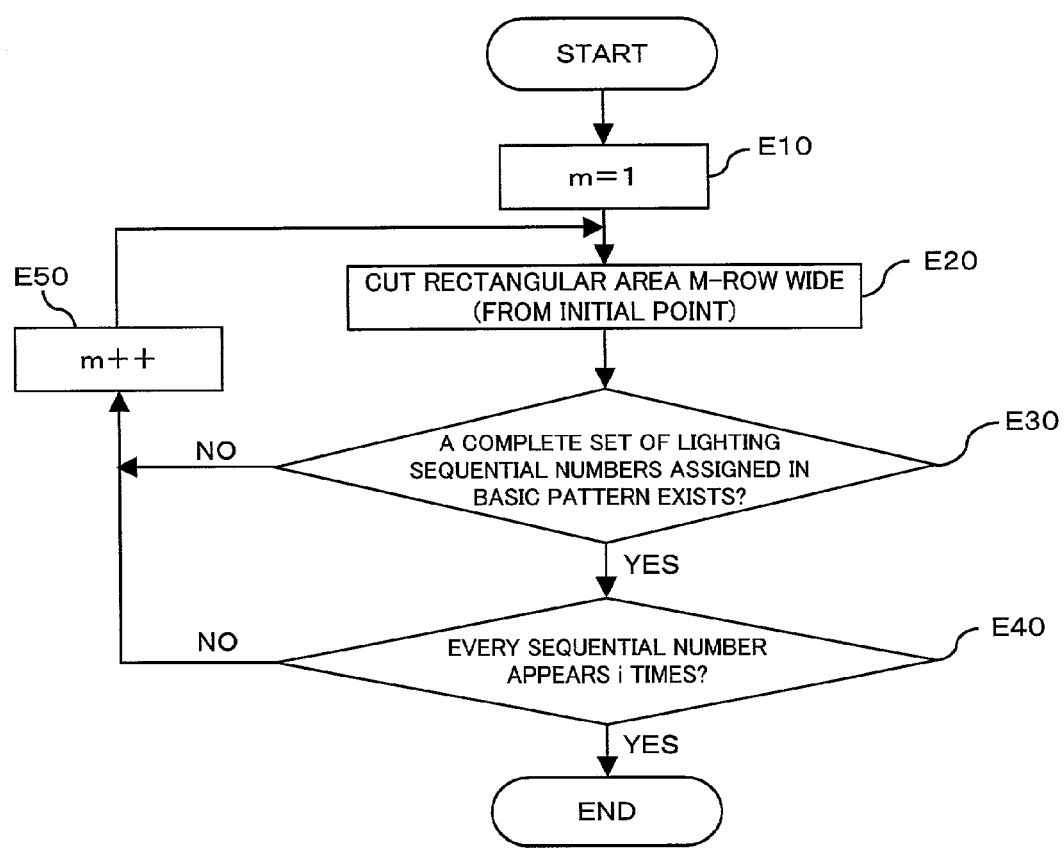
FIG. 17 is a flowchart indicating a method of cutting a motif-pattern by the rectangular pattern creating section.

A method of cutting such a motif-pattern by rectangular pattern creating section 30 will now be described hereinbelow with reference to the flowchart (step E10 through step E50) of FIG. 17.

After inputting "1" as a counter m (step E10), rectangular pattern creating section 30 cuts a rectangular area m-row wide, from its initial point, in a primary image scanning direction, thus being composed of (Y×m) pixels (step E20).

Rectangular pattern creating section 30 then evaluates whether or not every lighting sequence number (1 through n) appears at least once in those (Y×m) pixels (step E30). If the evaluation result is negative (NO route of step E30), rectangular pattern creating section 30 increments the counter m (step E50), and returns to step E20.

Otherwise, if the evaluation result is positive (YES route of step E30), rectangular pattern creating section 30 then evaluates whether or not every sequence number appears i times in the (Y×m) pixels (step E40).

If the evaluation result is negative (NO route of step E40), rectangular pattern creating section 30 moves to step E50. Otherwise, if the evaluation result is positive (YES route of step E40), rectangular pattern creating section 30 ends the processing.

The thus generated motif-pattern is stored in storage device 55 or RAM 53. When binary-coding is performed, the motif-pattern is used successively while its reference position is being shifted.

Figure 18:
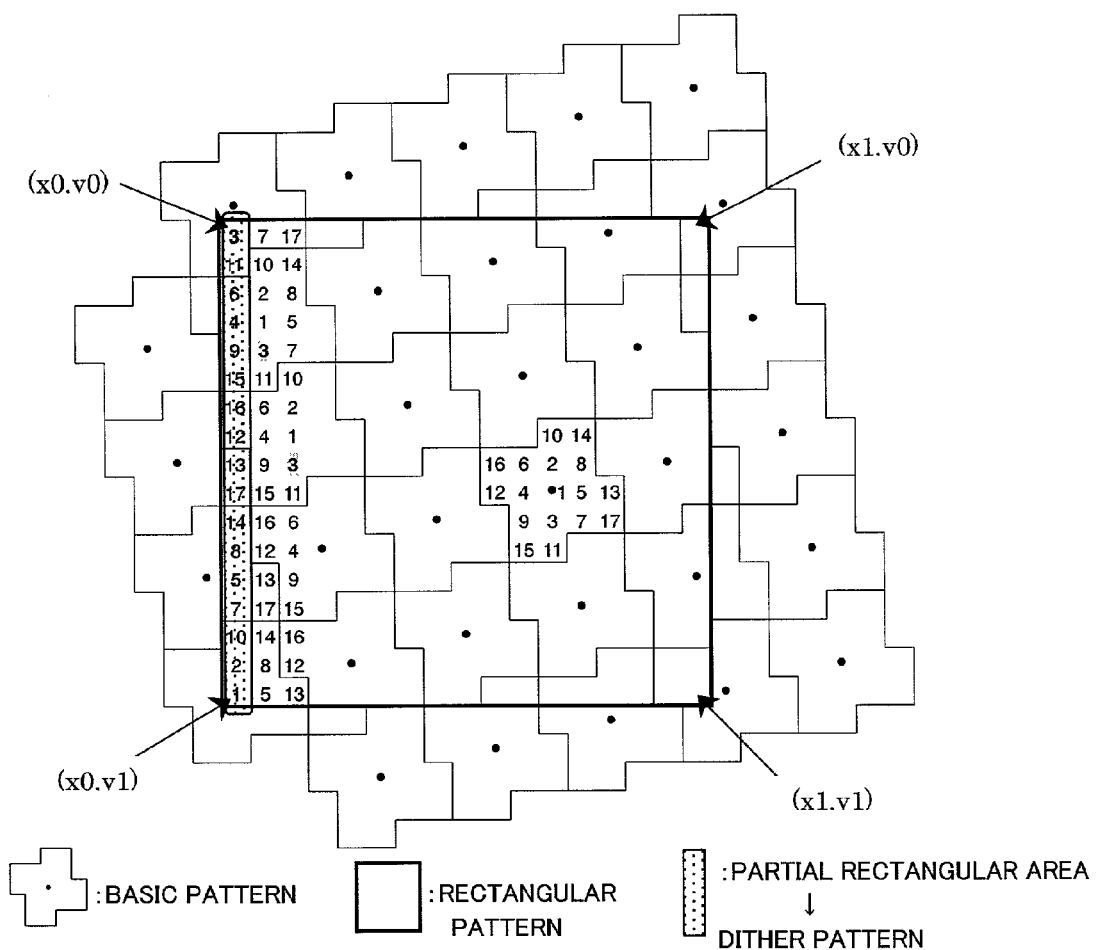
FIG. 18 is a diagram depicting an example of the motif-pattern.

FIG. 18 shows an example of such a motif-pattern where Y=n=17 and i=1.

In this example of FIG. 18, the current motif-pattern (from top, 3, 11, 6, 4 . . . , 2, 1) is referred to while being shifted by 14 (for example, in the next line, 7, 10, 2 . . . , 14, 8, 5).

FIG. 18 shows the case where Y=n, but the present invention should by no means be limited to this, and Y might take another numeral value than n. Various changes or modifications may be suggested without departing from the gist of the invention.

Figure 19:
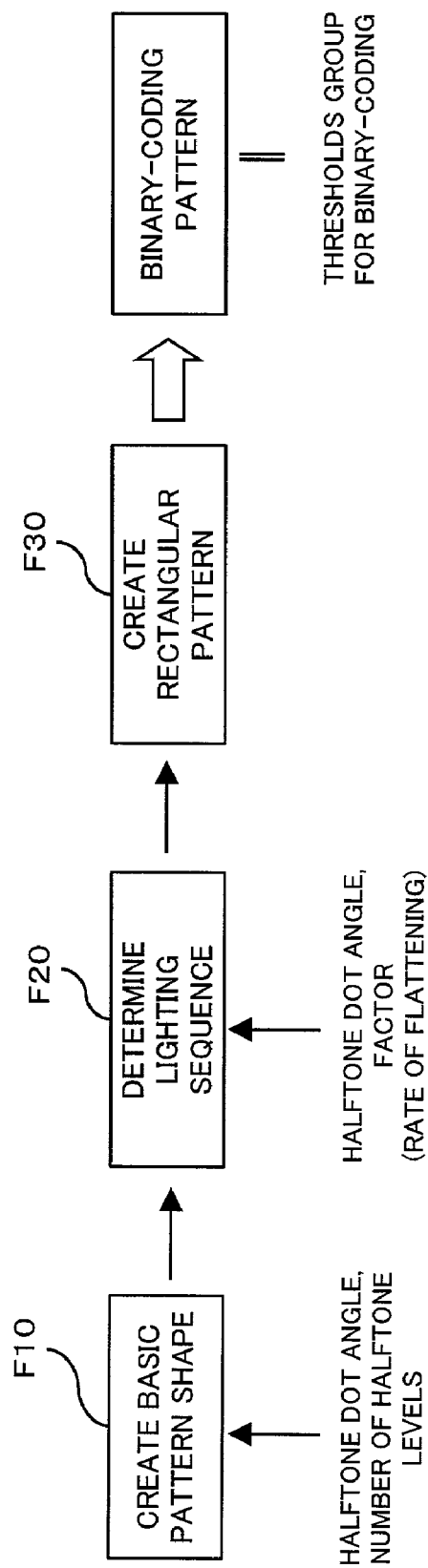
FIG. 19 is a flowchart indicating a binary-coding pattern creating method of one embodiment of the present invention.

In this manner, binary-coding pattern creating apparatus 1 creates a binary-coding pattern with a binary-coding pattern creating method according to one embodiment of the present invention. A binary-coding pattern creating method of one embodiment of the present invention will now be described with reference to the flowchart (step F10 through F30) of FIG. 19.

Firstly, basic pattern shape creating section 10 creates a basic pattern shape based on a designated screen angle (θ) and the number (n) of gray-scale levels (step F10). Lighting sequence determining section 20 then determines the sequence of lighting the pixels composing the basic pattern based on a distance between each of the pixels and a predetermined point (for example, the barycenter or the center of the basic pattern) (step F20). At that time, a rate of flattening can be set between each of the pixels and the predetermined point.

After that, rectangular pattern creating section 30 cuts a rectangular pattern in a particular size that is calculated using the above formulas (3) and (4), as a binary-coding pattern, from a spread of basic patterns in which basic patterns are arranged successively in both a primary image scanning direction and a secondary image scanning direction (step F30). In this instance, a characteristic part of the rectangular pattern might be cut therefrom.

In this manner, binary-coding pattern creating apparatus 1 of one embodiment of the present invention automates such processing as creation of a basis pattern shape, determination of the lighting sequence, and creation of a rectangular pattern, based on various formulas, thereby facilitating creating a binary-coding pattern. Accordingly, even any non-skilled operator can create a dither pattern with ease and in a short time.

Since basic pattern shape creating section 10 designates a binary-coding pattern angle and the number of pixels composing a basic pattern, and then creates a basic pattern shape by an arithmetic operation based on the thus designated angle and the number of pixels, it is possible to easily create a basic pattern which is at a desired angle and is composed of a desired number of pixels.

Further, since lighting sequence determining section 20 determines the sequence of lighting pixels composing a basic pattern based on a distance between the pixels and a predetermined point (center or barycenter) of the basic pattern, it is possible to easily create a centralized type of binary-coding pattern.

Since lighting sequence determining section 20 determines the sequence of lighting the pixels composing a basic pattern based on 1) a distance between a predetermined point in the basic pattern and each of the pixels and 2) a particular factor (rate of flattening) relevant to the distance, it is possible to change the shape of a halftone dot smoothly from a circular one to an oval one, and thus also possible to create a binary-coding pattern which minimizes dot displacement or moiré, with fewer operation steps and increased reliability.

Since lighting sequence determining section 20 determines the sequence of lighting the pixels in such a manner that the pixels are lighted sequentially from the one nearer to a predetermined point of the basic pattern, it is possible to obtain good coloring outputs even using a printer whose coloring material fixing capability is not stable.

In addition, since lighting sequence determining section 20 determines the sequence of lighting the pixels in such a manner that the length of an outline of the lighted pixels adjoining to the non-lighted ones is minimal, it is possible to minimize dot gains, so that fixation of coloring material is stabilized, thereby improving the quality of outputs.

Since rectangular pattern creating section 30 creates a rectangular pattern as a binary-coding pattern by cutting a rectangle in a particular size from a spread of basic patterns in which the basic patterns are arranged successively in both a primary image scanning direction and a secondary image scanning direction, it is possible to create a rectangular binary-coding pattern with ease.

Since rectangular pattern creating section 30 cuts a motif-pattern showing a distinctive characteristic of a rectangular pattern from the rectangular pattern to represent the rectangular pattern, it is possible to reduce a memory area (RAM 53) needed for expanding binary-coding patterns thereon and also a storage area (ROM 54 and storage device 55) for storing the binary-coding pattern, thereby reducing hardware manufacturing costs as well as improving processing speed.

Partly since the binary-coding pattern created by the binary-coding pattern creating method of the present invention is a motif-pattern showing a distinctive characteristic of the rectangular pattern, partly since this motif-pattern occupies a rectangular area that is measured Y in the primary scanning direction by i in the secondary scanning direction, thus being composed of Y×i pixels, and partly since Y measured in the primary scanning direction is equal to a length, measured in the primary scanning direction, of the rectangular pattern of the particular size; i measured in the secondary scanning direction is equal to a minimum quantity (the number of pixels), measured in the secondary scanning direction, essential for the rectangular area to include a complete set of lightening sequence numbers determined one for each of the pixels composing the basic pattern, it is possible to reduce the size of the binary-coding pattern, a memory area needed in binary-coding, and a storage area for storing the binary-coding pattern, thereby improving processing speed and reducing hardware manufacturing costs.

Further, as a basic pattern shape, one or more rectangles having corner points A(c, 1), B(a+c, b+1), C(0, d+1), D(a, b+d+1) where parameters a, b, c, and d are arbitrary integers satisfying n=ad+bc (n is the number of pixels having been designated). The one, out of such rectangles, which is at an angle approximate to a basic pattern angle having been designated, is selected as a basic pattern. Hereby, it is possible to create the basic pattern shape with ease, thus facilitating creating a binary-coding pattern.

Still further, since the sequence of lighting the pixels of the basic pattern is determined based on a weight which has been assigned to each of the pixels by an arithmetic operation according to a distance between a predetermined point in the basic pattern and each of the pixels, it is possible to determine the sequence of lighting the pixels with ease, thus also facilitating creating a binary-coding pattern.

Furthermore, a rectangular pattern is created by an arithmetic operation such that size (X) of the rectangular pattern measured in a secondary scanning direction satisfies:

$$\text{size}(X)=\max((n\div gcd(b,n)),(n\div gcd(d,n)))$$

and size (Y) of the rectangular pattern measured in a primary scanning direction satisfies:

$$\text{size}(Y)=\max((n\div gcd(a,n)),(n\div gcd(c,n)))$$

Hereby, it is possible to create the rectangular pattern with ease, thus also facilitating creating a binary-coding pattern.

(B) Other Modifications

Further, the present invention should by no means be limited to the above-illustrated embodiment, and various changes or modifications may be suggested without departing from the gist of the invention.

For example, although, in the above embodiment, a basic pattern is turned through $-\theta°$ before the sequence of lighting the pixels of the basic pattern is determined for the thus turned basic pattern, the sequence determination can also be carried out directly for the basic pattern without its being turned.

Further, in the above embodiment, lighting sequence determining section 20 splits the basic pattern horizontally into two parts across a horizontal line that lies on the center point (predetermined point) of the basic pattern, and assigns the lighting sequence numbers to the pixels of the upper half split and the lower half split, alternately, in descending order of the weights (W) of the pixels. Alternatively, the basic pattern might be split vertically into two parts across a vertical line that lies on a predetermined point of the basic pattern, and the lighting sequence numbers then might be assigned to the pixels of the right half split and the left half split, alternately, in descending order of the weights (W) of the pixels.

Still further, although, in the above embodiment, lighting sequence determining section 20 turns a basic pattern through $-\theta°$ before it calculates the weight (W) of the pixels of the thus turned basic pattern, the present invention should by no means be limited to this.

Figure 20A:
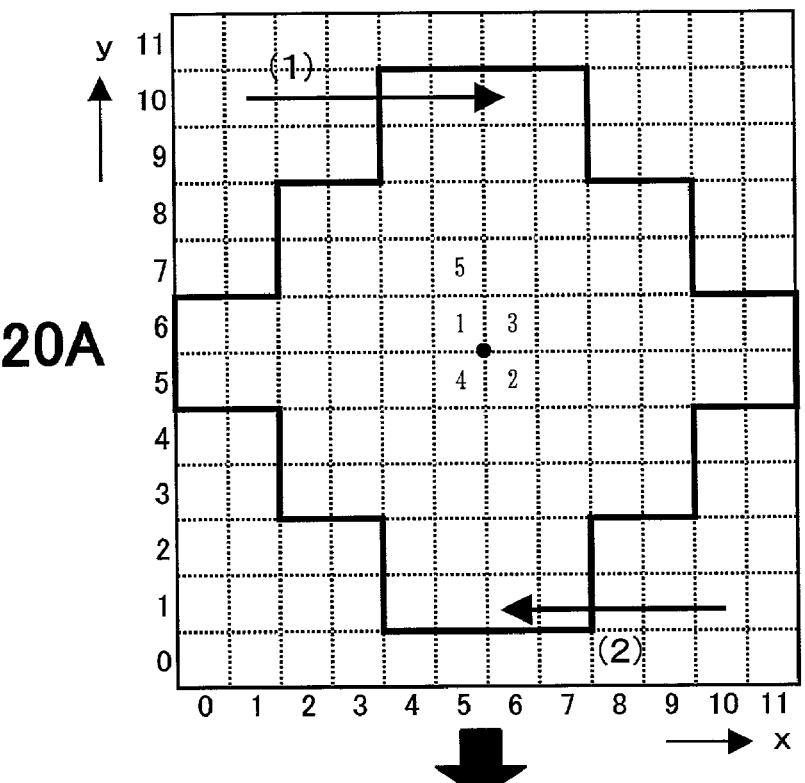
FIG. 20A is a diagram depicting a basic pattern shape in which the lighting sequence is halfway determined.
Figure 20B:
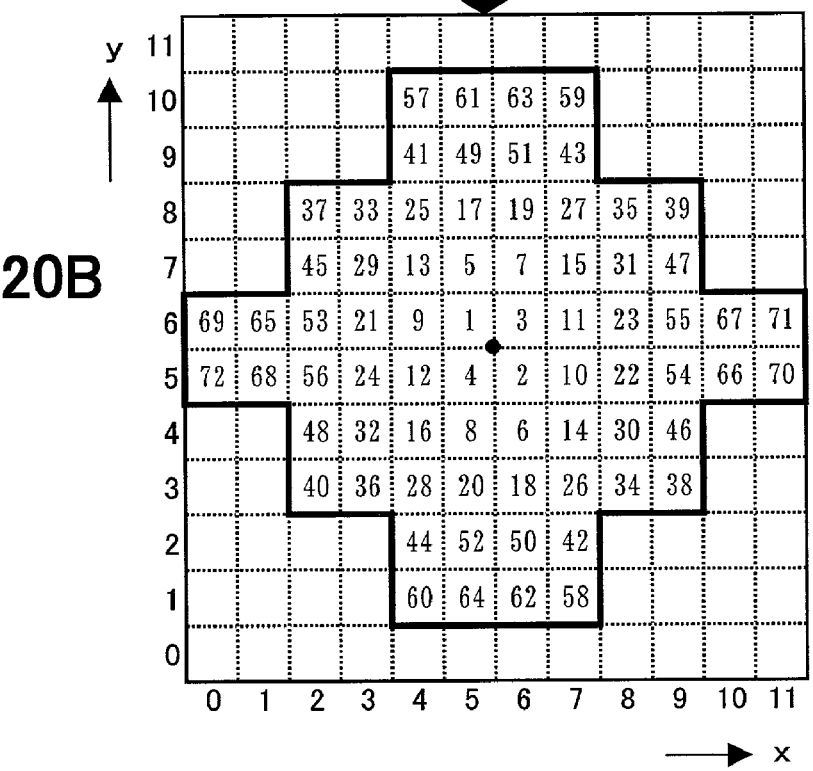
FIG. 20B is a diagram depicting the basic pattern in which the lighting sequence is completely determined.

FIG. 20(A) and FIG. 20(B) each show an example where a basic pattern is not turned before determining the sequence of lighting the pixels. FIG. 20(A) shows an example of the basic pattern in which the lighting sequence is determined only for a part of the pixels; FIG. 20(B), an example of the basic pattern in which the lighting sequence is completely determined for all of the pixels.

As shown in FIG. 20(A) and FIG. 20(B), lighting sequence determining section 20 might calculate the weight of each pixel for determining the lighting sequence without turning the basic pattern through $-\theta°$.

What is claimed is:

1. A method of creating a binary-coding pattern to be used in binary-coding a multi-value image, said method comprising:
    creating a basic pattern shape of a prospective binary-coding pattern by a first arithmetic operation;
    determining a sequence of lighting pixels composing such basic pattern by a second arithmetic operation; and
    creating a rectangular pattern, which serves as the prospective binary-coding pattern, based on the resultant basic pattern, and
    where said sequence of lighting the pixels is determined based on a distance between a predetermined point in said basic pattern and each last-named pixel.

2. The method of creating a binary-coding pattern according to claim 1, wherein said rectangular pattern is created by a third arithmetic operation.

3. The method of creating a binary-coding pattern according to claim 2, wherein creating the basic pattern includes:
    designating a pattern angle through which said binary-coding pattern is turned;
    designating a number of pixels composing said basic pattern; and
    executing an arithmetic operation based on said pattern angle designated and said number of pixels designated.

4. The method of creating a binary-coding pattern according to claim 3, wherein when creating the basic pattern,
    one or more rectangles are created which have the following corner points: point A(c, 1); point B(a+c, b+1); point C(0, d+1); and point D(a, b+d+1), parameters a, b, c, and d being arbitrary integers satisfying an equation of $n=ad+bc$, where n is the number of pixels designated, and
    the one, out of such rectangles, which is at an angle approximate to said pattern angle designated is selected as said basic pattern.

5. The method of creating a binary-coding pattern according to claim 4, wherein said sequence of lighting the pixels is determined based on a distance between a predetermined point in said basic pattern and each of the last-named pixels.

6. The method of creating a binary-coding pattern according to claim 5, wherein said sequence of lighting the pixels is determined in such a manner that the pixels are lighted sequentially from the one nearer to a predetermined point of said basic pattern, and that the length of an outline of the lighted pixels adjoining to the non-lighted ones is minimal.

7. The method of creating a binary-coding pattern according to claim 6, wherein said sequence of lighting the pixels is determined based on a coefficient which relates to a distance between a predetermined point in said basic pattern and each of the last-named pixels.

8. The method of creating a binary-coding pattern according to claim 5, wherein said sequence of lighting the pixels is determined based on a coefficient which relates to a distance between a predetermined point in said basic pattern and each of the last-named pixels.

9. The method of creating a binary-coding pattern according to claim 4, wherein said rectangular pattern is created by an arithmetic operation such that size (X) of said rectangular pattern measured in a secondary scanning direction satisfies:

size($X$)=max(($n$÷gcd($b,n$),($n$÷gcd($d,n$))

and size (Y) of said rectangular pattern measured in a primary scanning direction satisfies:

size($Y$)=max(($n$÷gcd($a,n$),($n$÷gcd($c,n$)).

10. The method of creating a binary-coding pattern according to claim 1, wherein creating the basic pattern includes:
designating a pattern angle through which said binary-coding pattern is turned;
designating a number of pixels composing said basic pattern; and
executing an arithmetic operation based on said pattern angle designated and said number of pixels designated.

11. The method of creating a binary-coding pattern according to claim 10, wherein when creating the basic pattern,
one or more rectangles are created which have the following corner points: point A(c, 1); point B(a+c, b+1); point C(0, d+1); and point D( a, b+d+1), parameters a, b, c, and d being arbitrary integers satisfying an equation of $n=ad+bc$, where n is the number of pixels, which is designated, and
the one, out of such rectangles, which is at an angle approximate to said pattern angle designated is selected as said basic pattern.

12. The method of creating a binary-coding pattern according to claim 11, wherein said rectangular pattern is created by an arithmetic operation such that size (X) of said rectangular pattern measured in a secondary scanning direction satisfies:

size($X$)=max(($n$÷gcd($b,n$),($n$÷gcd($d,n$))

and size (Y) of said rectangular pattern measured in a primary scanning direction satisfies:

size($Y$)=max(($n$÷gcd($a,n$),($n$÷gcd($c,n$)).

13. The method of creating a binary-coding pattern according to claim 1, wherein said sequence of lighting the pixels is determined in such a manner that the pixels are lighted sequentially from the one nearer to a predetermined point of said basic pattern, and that the length of an outline of the lighted pixels adjoining to the non-lighted ones is minimal.

14. The method of creating a binary-coding pattern according to claim 13, wherein said sequence of lighting the pixels is determined based on a coefficient which relates to a distance between a predetermined point in said basic pattern and each of the last-named pixels.

15. The method of creating a binary-coding pattern according to claim 1, wherein said sequence of lighting the pixels is determined based on a coefficient which relates to a distance between a predetermined point in said basic pattern and each of the last-named pixels.

16. The method of creating a binary-coding pattern according to claim 1, wherein said sequence of lighting the pixels is determined based on a weight which has been assigned to each of the pixels by an arithmetic operation according to a distance between a predetermined point in said basic pattern and each of the last-named pixels.

17. The method of creating a binary-coding pattern according to claim 1, wherein said rectangular pattern is created by cutting a rectangle in a particular size from a spread of said basic patterns in which said basic patterns are arranged successively in both a primary image scanning direction and a secondary image scanning direction.

18. The method of creating a binary-coding pattern according to claim 17, wherein a motif-pattern showing a distinctive characteristic of said rectangular pattern is cut from said rectangular pattern to represent said rectangular pattern.

19. The method of creating a binary-coding pattern according to claim 18, wherein:
said motif-pattern occupies a rectangular area that is measured Y in the primary scanning direction by i in the secondary scanning direction, thus being composed of y×i pixels;
Y measured in the primary scanning direction is equal to a length, measured in the primary scanning direction, of said rectangular pattern of the particular size; and
i measured in the secondary scanning direction is equal to a minimum quantity (the number of pixels), measured in the secondary scanning direction, essential for said rectangular area to include a complete set of lightening sequence numbers determined one for each of the pixels composing the basic pattern.

20. A method of creating a binary-coding pattern to be used in binary-coding a multi-value image, said method comprising:
creating a basic pattern shape of a prospective binary-coding pattern by a first arithmetic operation;
determining a sequence of lighting pixels composing such basic pattern; and
(c) creating a rectangular pattern, which serves as the prospective binary-coding pattern, based on the resultant basic pattern, and
where said sequence of lighting the pixels is determined based on a distance between a predetermined point in said basic pattern and each last-named pixel.

21. The method of creating a binary-coding pattern according to claim 20, wherein said rectangular pattern is created by a second arithmetic operation.

22. The method of creating a binary-coding pattern according to claim 20, wherein creating the basic pattern includes:
designating a pattern angle through which said binary-coding pattern is turned;
designating a number of pixels composing said basic pattern; and
executing an arithmetic operation based on said pattern angle designated and said number of pixels designated.

23. The method of creating a binary-coding pattern according to claim 22, wherein when creating the basic pattern
one or more rectangles are created which have the following corner points: point A(c, 1); point B(a+c, b+1); point C(0, d+1); and point D(a, b+d+1), parameters a, b, c, and d being arbitrary integers satisfying an equation of $n=ad+bc$, where n is the number of pixels is designated, and
the one, out of such rectangles, which is at an angle approximate to said pattern angle designated is selected as said basic pattern.

24. The method of creating a binary-coding pattern according to claim 20, wherein said sequence of lighting the pixels is determined in such a manner that the pixels are lighted sequentially from the one nearer to a predetermined point of said basic pattern, and that the length of an outline of the lighted pixels adjoining to the non-lighted ones is minimal.

25. The method of creating a binary-coding pattern according to claim 20, wherein said sequence of lighting the pixels is determined based on a coefficient which relates to a distance between a predetermined point in said basic pattern and each of the last-named pixels.

26. The method of creating a binary-coding pattern according to claim 20, wherein said rectangular pattern is created by cutting a rectangle in a particular size from a spread of said basic patterns in which said basic patterns are arranged successively in both a primary image scanning direction and a secondary image scanning direction.

27. A method of creating a binary-coding pattern to be used in binary-coding a multi-value image, said method comprising:
    creating a basic pattern shape of a prospective binary-coding pattern;
    determining a sequence of lighting pixels composing such basic pattern by a first arithmetic operation; and
    creating a rectangular pattern, which serves as the prospective binary-coding pattern, based on the resultant basic pattern, and
    where said sequence of lighting the pixels is determined based on a distance between a predetermined point in said basic pattern and each last-named pixel.

28. The method of creating a binary-coding pattern according to claim 27, wherein said rectangular pattern is created by a second arithmetic operation.

29. The method of creating a binary-coding pattern according to claim 27, wherein creating the basic pattern includes:
    designating a pattern angle through which said binary-coding pattern is turned;
    designating a number of pixels composing said basic pattern; and
    executing an arithmetic operation based on said pattern angle designated and said number of pixels designated.

30. The method of creating a binary-coding pattern according to claim 29, wherein when creating the basic pattern
    one or more rectangles are created which have the following corner points: point A(c, 1); point B(a+c, b+1); point C(0, d+1); and point D(a, b+d+1), parameters a, b, c, and d being arbitrary integers satisfying an equation of $n=ad+bc$, where n is the number of pixels, which is designated, and
    the one, out of such rectangles, which is at an angle approximate to said pattern angle designated is selected as said basic pattern.

31. The method of creating a binary-coding pattern according to claim 27, wherein said sequence of lighting the pixels is determined in such a manner that the pixels are lighted sequentially from the one nearer to a predetermined point of said basic pattern, and that the length of an outline of the lighted pixels adjoining to the non-lighted ones is minimal.

32. The method of creating a binary-coding pattern according to claim 27, wherein said sequence of lighting the pixels is determined based on a coefficient which relates to a distance between a predetermined point in said basic pattern and each of the last-named pixels.

33. The method of creating a binary-coding pattern according to claim 27, wherein said sequence of lighting the pixels is determined based on a weight which has been assigned to each of the pixels by an arithmetic operation according to a distance between a predetermined point in said basic pattern and each of the last-named pixels.

34. The method of creating a binary-coding pattern according to claim 27, wherein said rectangular pattern is created by cutting a rectangle in a particular size from a spread of said basic patterns in which said basic patterns are arranged successively in both a primary image scanning direction and a secondary image scanning direction.

35. An apparatus for creating a binary-coding pattern to be used in binary-coding a multi-value image, said apparatus comprising:
    a basic pattern shape creating section for creating a basic pattern shape of the prospective binary-coding pattern by a first arithmetic operation;
    a lighting sequence determining section for determining the sequence of lighting pixels composing such basic pattern by a second arithmetic operation; and
    a rectangular pattern creating section for creating a rectangular pattern, which serves as the prospective binary-coding pattern, by a third arithmetic operation based on the resultant basic pattern, and
    where said sequence of lighting the pixels is determined based on a distance between a predetermined point in said basic pattern and each last-named pixel.

36. The apparatus for creating a binary-coding pattern according to claim 35, wherein said basic pattern shape creating section includes:
    an angle designating section for designating a pattern angle through which the prospective binary-coding pattern is turned;
    a number-of-pixels designating section for designating the number of pixels composing said basic pattern; and
    an arithmetic section for executing an arithmetic operation based on said pattern angle designated by said angle designating section and said number of pixels designated by said number-of-pixels designating section.

37. The apparatus for creating a binary-coding pattern according to claim 36, wherein:
    said basic pattern shape creating section creates one or more rectangles which have the following corner points: point A(c, 1); point B(a+c, b+1); point C(0, d+1); and point D(a, b+d+1), parameters a, b, c, and d being arbitrary integers satisfying an equation of $n=ad+bc$, where n is the number of pixels which is designated by said number-of-pixels designating section, and
    out of such rectangles, said basic pattern shape creating section selects the one which is at an angle approximate to said pattern angle designated by said number-of-pixels designating section, as said basic pattern.

38. The apparatus for creating a binary-coding pattern according to claim 37, wherein said rectangular pattern creating section creates said rectangular pattern by an arithmetic operation such that size (X) of said rectangular pattern measured in a secondary scanning direction satisfies:

$$\text{size}(X)=\max((n\div gcd(b,n)),(n\div gcd(d,n)))$$

and size (Y) of said rectangular pattern measured in a primary scanning direction satisfies:

$$\text{size}(Y)=\max((n\div gcd(a,n)),(n\div gcd(c,n))).$$

39. The apparatus for creating a binary-coding pattern according to claim 35, wherein said lighting sequence determining section determines said sequence of lighting the pixels in such a manner that the pixels are lighted successively from the one nearer to a predetermined point of said basic pattern, and that the length of an outline of the lighted pixels adjoining to the non-lighted ones is minimal.

40. The apparatus for creating a binary-coding pattern according to claim 35, wherein said lighting sequence determining section determines said sequence of lighting the pixels based on a coefficient which relates to a distance between a predetermined point in said basic pattern and each of the last-named pixels.

41. The apparatus for creating a binary-coding pattern according to claim 35, wherein said rectangular pattern creating section cuts such rectangular pattern in a particular size from a spread of said basic patterns in which said basic patterns are arranged successively in both a primary image scanning direction and a secondary image scanning direction.

42. The apparatus for creating a binary-coding pattern according to claim 41, wherein said rectangular pattern creating section cuts a motif-pattern, which shows a distinctive characteristic of the rectangular pattern, from said rectangular pattern as a representative of said rectangular pattern.

43. The apparatus for creating a binary-coding pattern according to claim 42, wherein:
said motif-pattern occupies a rectangular area that is measured Y in a primary scanning direction by i in a secondary scanning direction, thus being composed of y×i pixels;
Y measured in the primary scanning direction is equal to a length, measured in the primary scanning direction, of said rectangular pattern of the particular size; and
i measured in the secondary scanning direction is equal to a minimum quantity (the number of pixels), measured in the secondary scanning direction, essential for said rectangular area to include a complete set of lightening sequence numbers determined one for each of the pixels composing said basic pattern.

44. A computer-readable recording medium which stores a binary-coding pattern creating program for creating a binary-coding pattern to be used in binary-coding a multi-value image, wherein said program instructs a computer to execute operations, said operations comprising:
creating a basic pattern shape of a prospective binary-coding pattern by a first arithmetic operation;
determining a sequence of lighting pixels composing such basic pattern by a second arithmetic operation; and
creating a rectangular pattern, which serves as the prospective binary-coding pattern, by a third arithmetic operation based on the resultant basic pattern, and
where said sequence of lighting the pixels is determined based on a distance between a predetermined point in said basic pattern and each last-named pixel.

45. The computer-readable recording medium according to claim 44, wherein creating basic pattern shape includes:
designating a pattern angle through which the prospective binary-coding pattern is turned;
designating the number of pixels composing said basic pattern; and
executing an arithmetic operation based on said pattern angle designated and said number of pixels designated.

46. The computer-readable recording medium according to claim 45, wherein:
when creating said basic pattern shape, one or more rectangles are created which have the following corner points: point A(c, 1); point B(a+c, b+1); point C(0, d+1); and point D(a, b+d+1), parameters a, b, c, and d being arbitrary integers satisfying an equation of $n=ad+bc$, where n is the number of pixels which is designated by said number-of-pixels designating section, and
out of such rectangles, the one which is at an angle approximate to said pattern angle designated is selected as said basic pattern.

47. The computer-readable recording medium according to claim 46, wherein:
said rectangular pattern is created by an arithmetic operation such that size (X) of said rectangular pattern measured in a secondary scanning direction satisfies:

$$\text{size}(X)=\max((n\div gcd(b,n),(n\div gcd(d,n)))$$

and size (Y) of said rectangular pattern measured in a primary scanning direction satisfies:

$$\text{size}(Y)=\max((n\div gcd(a,n),(n\div gcd(c,n))).$$

48. The computer-readable recording medium according to claim 44, wherein said sequence of lighting the pixels is determined in such a manner that the pixels are lighted successively from the one nearer to a predetermined point of said basic pattern, and that the length of an outline of the lighted pixels adjoining to the non-lighted ones is minimal.

49. The computer-readable recording medium according to claim 44, wherein said sequence of lighting the pixels is determined based on a coefficient which relates to a distance between a predetermined point in said basic pattern and each of the last-named pixels.

50. The computer-readable recording medium according to claim 44, wherein said rectangular pattern is created by cutting a rectangular pattern in a particular size from a spread of said basic patterns in which said basic patterns are arranged successively in both a primary image scanning direction and a secondary image scanning direction.

51. The computer-readable recording medium according to claim 50, wherein a motif-pattern, which shows a distinctive characteristic of said rectangular pattern, is cut from said rectangular pattern as a representative of said rectangular pattern.

52. The computer-readable recording medium according to claim 51, wherein:
said motif-pattern occupies a rectangular area that is measured Y in a primary scanning direction by i in a secondary scanning direction, thus being composed of y×i pixels;
Y measured in the primary scanning direction is equal to a length, measured in the primary scanning direction, of said rectangular pattern of the particular size; and
i measured in the secondary scanning direction is equal to a minimum quantity (the number of pixels), measured in the secondary scanning direction, essential for said rectangular area to include a complete set of lightening sequence numbers determined one for each of the pixels composing said basic pattern.

* * * * *

UNITED STATES PATENT AND TRADEMARK OFFICE
CERTIFICATE OF CORRECTION

PATENT NO. : 7,050,638 B2  
APPLICATION NO. : 10/000072  
DATED : May 23, 2006  
INVENTOR(S) : Akiko Nagae et al.

Page 1 of 1

It is certified that error appears in the above-identified patent and that said Letters Patent is hereby corrected as shown below:

Col. 26, line 20, delete "yxi" and insert --Y x i--, therefor.

Col. 26, line 37, delete "(c)" before "creating".

Col. 28, lines 48-49, delete "$n=ad+_{bc}$" and insert --n=ad+bc--, therefor.

Col. 29, line 30, delete "yxi" and insert --Y x i--, therefor.

Col. 30, lines 7-8, delete "$n=ad+_{bc}$" and insert --n=ad+bc--, therefor.

Col. 30, line 49, delete "yxi" and insert --Y x i--, therefor.

Signed and Sealed this

Fifteenth Day of August, 2006

JON W. DUDAS  
*Director of the United States Patent and Trademark Office*